US007643265B2

(12) United States Patent
Loader et al.

(10) Patent No.: US 7,643,265 B2
(45) Date of Patent: Jan. 5, 2010

(54) GAS-FILLED SURGE ARRESTER, ACTIVATING COMPOUND, IGNITION STRIPES AND METHOD THEREFORE

(75) Inventors: Kelvin Loader, Froggs Bottom (GB); Stephen J. Whitney, Lake Zurich, IL (US)

(73) Assignee: Littelfuse, Inc., Chicago, IL (US)

( * ) Notice: Subject to any disclaimer, the term of this patent is extended or adjusted under 35 U.S.C. 154(b) by 498 days.

(21) Appl. No.: 11/531,903

(22) Filed: Sep. 14, 2006

(65) Prior Publication Data

US 2007/0064372 A1 Mar. 22, 2007

Related U.S. Application Data

(60) Provisional application No. 60/716,866, filed on Sep. 14, 2005.

(51) Int. Cl.
*H02H 1/00* (2006.01)
*H02H 7/20* (2006.01)

(52) U.S. Cl. ...................................... 361/120; 361/112

(58) Field of Classification Search ................. 361/112, 361/120

See application file for complete search history.

(56) References Cited

U.S. PATENT DOCUMENTS 3,348,929 A 10/1967 Valtschev et al.
3,582,702 A 6/1971 Almer
3,676,743 A 7/1972 Bahr et al.
3,691,428 A 9/1972 Bahr et al.
3,709,727 A 1/1973 Miller
3,942,161 A 3/1976 Byrum, Jr. et al.
3,953,376 A 4/1976 Kern
3,963,568 A 6/1976 Nikaido et al.
3,989,985 A 11/1976 Lange et al.
4,031,426 A 6/1977 Kern
4,048,533 A 9/1977 Hinson et al.
4,065,688 A 12/1977 Thornton
4,104,693 A 8/1978 Toda et al.
4,169,985 A 10/1979 Ernsthausen et al.
4,187,526 A 2/1980 Heinze et al.
4,218,632 A 8/1980 Ernsthausen et al.
4,266,260 A 5/1981 Lange et al.

(Continued)

FOREIGN PATENT DOCUMENTS

JP 55-003104 6/1978

(Continued)

OTHER PUBLICATIONS

Int. Search Report, Sep. 25, 2007, PCT, For PCT/US06/35647.

*Primary Examiner*—Ronald W Leja
(74) *Attorney, Agent, or Firm*—Duane Morris LLP

(57) ABSTRACT

A gas-filled surge arrester includes at least two electrodes, a gas filling and an activating compound applied to at least one of said electrodes. The activating compound can include: (i) nickel powder in an amount of about 10% to about 35% by weight; (ii) potassium or sodium silicate in an amount of about 20% to about 40% by weight; (iii) titanium powder in an amount of about 5% to about 25% by weight; (iv) calcium titanium oxide in an amount of about 5% to about 15% by weight; and (v) sodium bromide in an amount of about 10% to about 20% by weight. Ignition striping process and resulting stripes from ink-jetting of striping material are disclosed.

27 Claims, 11 Drawing Sheets

U.S. PATENT DOCUMENTS

| | | | |
|---|---|---|---|
| 4,321,651 | A | 3/1982 | Ozawa et al. |
| 4,341,978 | A | 7/1982 | Thornton, Jr. et al. |
| 4,360,757 | A | 11/1982 | Hahndorff |
| 4,362,962 | A | 12/1982 | Lange |
| 4,407,849 | A | 10/1983 | Haas et al. |
| 4,433,354 | A | 2/1984 | Lange et al. |
| 4,491,893 | A | 1/1985 | Toda et al. |
| 4,493,004 | A | 1/1985 | Lange et al. |
| 4,498,952 | A | 2/1985 | Christensen |
| 4,524,297 | A | 6/1985 | Gartner |
| 4,553,063 | A | 11/1985 | Geibig et al. |
| 4,583,147 | A | 4/1986 | Boy et al. |
| 4,600,604 | A | 7/1986 | Siuta |
| 4,610,808 | A | 9/1986 | Kleiner |
| 4,634,935 | A | 1/1987 | Hillenbrand et al. |
| 4,658,181 | A | 4/1987 | Cooper et al. |
| 4,663,559 | A | 5/1987 | Christensen |
| 4,665,337 | A | 5/1987 | Watzke et al. |
| 4,709,185 | A | 11/1987 | Hoeberechts et al. |
| 4,726,991 | A | 2/1988 | Hyatt et al. |
| 4,736,135 | A | 4/1988 | Zwier et al. |
| 4,739,439 | A | 4/1988 | Boy |
| 4,769,736 | A | 9/1988 | Boy |
| 4,797,778 | A | 1/1989 | Boy |
| 4,810,289 | A | 3/1989 | Hoyer et al. |
| 4,831,485 | A | 5/1989 | Boy et al. |
| 4,833,361 | A | 5/1989 | Suzuki et al. |
| 4,837,480 | A | 6/1989 | Breeze et al. |
| 4,845,062 | A | 7/1989 | Burn |
| 4,874,981 | A | 10/1989 | Spindt |
| 4,881,009 | A | 11/1989 | Passmore |
| 4,891,731 | A | 1/1990 | Bobert |
| 4,900,285 | A | 2/1990 | van Esdonk et al. |
| 4,924,347 | A | 5/1990 | Cantagrel |
| 5,021,708 | A | 6/1991 | Nugues et al. |
| 5,030,879 | A | 7/1991 | Derks |
| 5,057,740 | A | 10/1991 | Kirkman-Amemiya |
| 5,063,324 | A | 11/1991 | Grunwald |
| 5,072,148 | A | 12/1991 | Grunwald et al. |
| 5,103,135 | A | 4/1992 | Lange et al. |
| 5,111,108 | A | 5/1992 | Goodman et al. |
| 5,132,081 | A | 7/1992 | Lee |
| 5,151,630 | A | 9/1992 | Boy et al. |
| 5,159,238 | A | 10/1992 | Koiwa et al. |
| 5,170,422 | A | 12/1992 | Fiebiger |
| 5,171,180 | A | 12/1992 | Lee |
| 5,175,056 | A | 12/1992 | Teichmann |
| 5,189,346 | A | 2/1993 | Branston et al. |
| 5,229,688 | A | 7/1993 | Branston et al. |
| 5,277,637 | A | 1/1994 | Derks |
| 5,312,777 | A | 5/1994 | Cronin et al. |
| 5,336,970 | A | 8/1994 | Einbinder |
| 5,417,600 | A | 5/1995 | Maegawa et al. |
| 5,422,542 | A | 6/1995 | Schaeffer |
| 5,443,786 | A | 8/1995 | Yokoyama et al. |
| 5,475,281 | A | 12/1995 | Heijboer |
| 5,518,663 | A | 5/1996 | LaBranche et al. |
| 5,548,185 | A | 8/1996 | Kumar et al. |
| 5,557,168 | A | 9/1996 | Nakajima et al. |
| 5,571,455 | A | 11/1996 | Higuchi |
| 5,592,043 | A | 1/1997 | Gartner et al. |
| 5,614,784 | A | 3/1997 | Harzig et al. |
| 5,654,606 | A | 8/1997 | Weijtens et al. |
| 5,656,883 | A | 8/1997 | Christensen |
| 5,671,114 | A | 9/1997 | Daumer et al. |
| 5,674,100 | A | 10/1997 | Ono et al. |
| 5,679,043 | A | 10/1997 | Kumar |
| 5,712,756 | A | 1/1998 | Ozawa et al. |
| 5,713,775 | A | 2/1998 | Geis et al. |
| 5,745,330 | A | 4/1998 | Yang |
| 5,749,763 | A | 5/1998 | Yoshioka et al. |
| 5,757,115 | A | 5/1998 | Narita et al. |
| 5,768,082 | A | 6/1998 | Lange et al. |
| 5,768,085 | A | 6/1998 | Boy et al. |
| 5,828,164 | A | 10/1998 | Branovich |
| 5,858,277 | A | 1/1999 | Chau et al. |
| 5,892,648 | A | 4/1999 | Bobert et al. |
| 5,905,339 | A | 5/1999 | Chow et al. |
| 5,917,284 | A | 6/1999 | Moore et al. |
| 5,922,245 | A | 7/1999 | Mohri et al. |
| 5,936,354 | A | 8/1999 | Smith et al. |
| 5,945,790 | A | 8/1999 | Schaefer |
| 5,982,097 | A | 11/1999 | Mehrotra |
| 5,993,973 | A | 11/1999 | Lee et al. |
| 5,995,355 | A | 11/1999 | Daeumer |
| 6,019,913 | A | 2/2000 | Dinh et al. |
| 6,034,469 | A | 3/2000 | Uda et al. |
| 6,037,714 | A | 3/2000 | Mehrotra et al. |
| 6,060,841 | A | 5/2000 | Niiyama et al. |
| 6,097,139 | A | 8/2000 | Tuck et al. |
| 6,116,975 | A | 9/2000 | Saeto et al. |
| 6,160,347 | A | 12/2000 | Iwasaki et al. |
| 6,194,820 | B1 | 2/2001 | Machida |
| 6,220,912 | B1 | 4/2001 | Shigeoka et al. |
| 6,231,412 | B1 | 5/2001 | Kawade et al. |
| 6,252,341 | B1 | 6/2001 | Hasegawa et al. |
| 6,278,231 | B1 | 8/2001 | Iwasaki et al. |
| 6,299,497 | B1 | 10/2001 | Nishimura et al. |
| 6,304,024 | B1 | 10/2001 | Uda et al. |
| 6,306,003 | B1 | 10/2001 | Nakagawa |
| 6,312,622 | B1 | 11/2001 | Toshima et al. |
| 6,313,578 | B1 | 11/2001 | Mishra et al. |
| 6,313,581 | B1 | 11/2001 | Machida |
| 6,342,755 | B1 | 1/2002 | Russ et al. |
| 6,348,756 | B1 | 2/2002 | Gartner et al. |
| 6,351,061 | B1 | 2/2002 | Yamauchi et al. |
| 6,362,945 | B1 | 3/2002 | Bobert et al. |
| 6,376,975 | B1 | 4/2002 | Nakagawa |
| 6,384,534 | B1 | 5/2002 | Srivastava et al. |
| 6,406,513 | B2 | 6/2002 | Yamaguchi |
| 6,417,604 | B1 | 7/2002 | Hartmann et al. |
| 6,417,607 | B1 | 7/2002 | Thielen |
| 6,425,793 | B1 | 7/2002 | Hasegawa |
| 6,447,355 | B1 | 9/2002 | Uda et al. |
| 6,462,467 | B1 | 10/2002 | Russ |
| 6,465,603 | B2 | 10/2002 | Schmid |
| 6,465,955 | B1 | 10/2002 | Kraus et al. |
| 6,492,765 | B1 | 12/2002 | Yamagishi |
| 6,494,931 | B1 | 12/2002 | Mukuno et al. |
| 6,529,361 | B1 | 3/2003 | Petschel et al. |
| 6,534,913 | B1 | 3/2003 | Perrin et al. |
| 6,563,256 | B1 | 5/2003 | Zavadil et al. |
| 6,565,402 | B2 | 5/2003 | Yamauchi et al. |
| 6,569,358 | B1 | 5/2003 | Tai et al. |
| 6,570,090 | B1 | 5/2003 | Boy et al. |
| 6,600,260 | B2 | 7/2003 | Feldmann et al. |
| 6,614,188 | B1 | 9/2003 | Lindhout et al. |
| 6,617,770 | B2 | 9/2003 | Machida |
| 6,617,781 | B2 | 9/2003 | Murazaki et al. |
| 6,617,804 | B2 | 9/2003 | Machida |
| 6,624,555 | B2 | 9/2003 | Hell et al. |
| 6,641,450 | B2 | 11/2003 | Moon et al. |
| 6,660,074 | B1 | 12/2003 | Lamparello |
| 6,664,004 | B2 | 12/2003 | Krause et al. |
| 6,674,240 | B1 | 1/2004 | Gartner et al. |
| 6,680,574 | B1 | 1/2004 | Gaertner et al. |
| 6,705,913 | B2 | 3/2004 | Nakagawa |
| 6,710,996 | B2 | 3/2004 | Bobert et al. |
| 6,943,495 | B2 | 9/2005 | Ma et al. |
| 2001/0018116 | A1 | 8/2001 | Hayashi et al. |
| 2001/0024081 | A1 | 9/2001 | Moon et al. |
| 2001/0043042 | A1 | 11/2001 | Murazaki et al. |
| 2002/0003227 | A1 | 1/2002 | Kageyama et al. |
| 2002/0041140 | A1 | 4/2002 | Rho et al. |

| | | | |
|---|---|---|---|
| 2002/0045398 | A1 | 4/2002 | Yamauchi et al. |
| 2002/0125806 | A1 | 9/2002 | Sugimura et al. |
| 2002/0145134 | A1 | 10/2002 | Olding et al. |
| 2002/0163315 | A1 | 11/2002 | Kaneko et al. |
| 2002/0167258 | A1 | 11/2002 | Dittrich et al. |
| 2002/0175616 | A1 | 11/2002 | Feldmann et al. |
| 2002/0182969 | A1 | 12/2002 | Moradi et al. |
| 2002/0185961 | A1 | 12/2002 | Oskam et al. |
| 2002/0190645 | A1 | 12/2002 | Oskam et al. |
| 2002/0190669 | A1 | 12/2002 | Juestel et al. |
| 2002/0195919 | A1 | 12/2002 | Choi et al. |
| 2003/0004066 | A1 | 1/2003 | Iruvanti et al. |
| 2003/0098445 | A1 | 5/2003 | Higuma et al. |
| 2003/0098653 | A1 | 5/2003 | Haacke et al. |
| 2003/0178942 | A1 | 9/2003 | Born et al. |
| 2004/0016914 | A1 | 1/2004 | Matsuda et al. |
| 2004/0075379 | A1 | 4/2004 | Jin |

FOREIGN PATENT DOCUMENTS

| | | | |
|---|---|---|---|
| JP | 04-198295 | | 11/1990 |
| JP | 04-229945 | | 7/1991 |
| JP | 09-007547 | | 6/1995 |
| JP | 10-188907 | | 12/1996 |
| JP | 2000-323091 | | 5/1999 |
| JP | 2000-106136 | | 9/1999 |
| WO | WO 00/77899 | A2 | 12/2000 |
| WO | WO 00/77900 | A2 | 12/2000 |
| WO | WO 02/078051 | A1 | 10/2002 |
| WO | WO 03/049244 | A1 | 6/2003 |

Gas Discharge Tube
Voltage vs. Current Characteristics

Pencil

Ink Jet

GAS-FILLED SURGE ARRESTER, ACTIVATING COMPOUND, IGNITION STRIPES AND METHOD THEREFORE

PRIORITY CLAIM

This application claims priority to and the benefit of U.S. Provisional Patent Application GAS-FILLED SURGE ARRESTER, ACTIVATING COMPOUND, IGNITION STRIPES AND METHOD THEREFORE, filed Sep. 14, 2005, Ser. No. 60/716,866.

BACKGROUND

The present invention relates generally to electronic components and more particularly to surge protection and gas tube surge arresters.

The demand for devices that protect sensitive electronic components from overvoltage surges is increasing. There are different devices on the market for this purpose. Certain of these devices are better suited for certain applications.

There are generally two surge protection classifications, each including different types of devices. One classification of surge protection devices is the "crowbar" classification. Crowbar devices include air gaps, carbon blocks, silicon controlled rectifiers ("SCR's"), voltage variable material ("VVM") devices and gas tube surge arresters, the subject of the present invention. Another classification of surge protection devices is the "clamping" classification. Clamping devices include zener or avalanche diodes and metal oxide varisters ("MOV's").

"Clamping" devices limit the voltage transient to a specified level by varying an internal resistance based on the applied voltage. The clamping devices themselves absorb the energy of the transient. Clamping devices have relatively quick response times but are relatively limited in ability to withstand high current levels.

Generally, a "crowbar" device limits the energy delivered to the protected circuit by abruptly changing from a high impedance state a low impedance state in response to an elevated voltage level. After being subjected to a sufficient voltage level the crowbar device, which is normally nonconductive, begins to conduct. While conducting, the arc voltage across the crowbar device remains relatively low (e.g., at or below 15 volts for gas discharge tube curve as shown below in FIG. 3. The majority of the transient's power is dissipated to ground or to the resistive elements of the circuit and not to the portion of the circuit intended to be protected by the crowbar device or gas tube surge arresters. Such power dissipation renders gas tube surge arresters able to withstand and protect loads from higher voltage and/or higher current levels for a greater duration of time than clamping devices.

Referring to FIG. 1, one known gas tube surge arrester 10 includes two electrodes 12 and 14 that are fitted with a hollow cylindrical ceramic insulator 16. Inside the insulator 16, inner surfaces of electrodes 12 and 14 are coated with an activating compound. Referring to FIGS. 2A and 2B, another known gas tube surge arrester 20 includes the two outer electrodes 12 and 14 that are fitted with two ceramic insulators 20 and 22, which are separated by a third electrode 24. Both arresters 10 and 20 house a gas, such as argon or neon. The activating compound aids in making the gas conductive upon an overvoltage transient event.

Operating parameters for gas tube surge arresters include: (i) static or DC sparkover voltage, (ii) dynamic or surge sparkover voltage, (iii) extinguishing voltage, (iv) glow voltage, (v) current-carrying capacity under alternating current and (vi) unipolar pulsed current. Those operating parameters can be effected by various factors, such as: (i) the structural layout of the electrodes, (ii) the type of gas used, (iii) the pressure at which the gas is maintained within the arrester, (iv) the configuration of one or more ignition strip within the arrester, and (v) the activating compound disposed on the active surfaces of the electrodes.

The activating compounds can include multiple components. For example, one known compound includes three components, namely, aluminum, sodium bromide and barium titanate. While this compound is useable, a need exists for new activating compounds that attempt to improve the operating parameters of gas tube surge arresters, such as the operating parameters listed above.

SUMMARY

Discussed in more detail below are multiple examples of gas filled surge arresters. The arresters generally include at least two electrodes coupled to an insulative housing. A gas is filled into the housing enclosed by the electrodes. An activating compound is applied to at least one of said electrodes. Under normal operation and normal operating voltages current cannot conduct from one electrode to another. Upon an overvoltage condition, the voltage reaches a breakdown point at which the gas ionizes and creates a conductive path. Once current is passing through the device the electrode coating acts as a electron source, protecting the metal electrode and allowing the overvoltage condition to be repeated many times before the device exceeds its specified operating parameters. During this period as seen below in FIG. 3, the voltage is held a particular voltage, e.g., about 15 volts, and corresponding current is able to flow, e.g., to be dissipated to ground, minimizing the potentially harmful effects of the overvoltage condition.

The housing can be made of any suitable insulating material, such as ceramic, glass, plastic or any suitable combination thereof. The housing can be at least generally cylindrical or of any suitable shape that can be hermetically sealed to hold a gas atmosphere. To that end, the housing is made to have a thickness capable of holding a gas atmosphere and withstand large mechanical stresses associated with absorbing large surge currents, such as found with a lightning surge.

In one embodiment a single housing is employed. The electrodes are attached at each end of the housing. In another embodiment, two housings are employed. An electrode attaches at an outer end of each housing. A third inner electrode is sandwiched between the two housings. In one implementation the inner electrode is coated on one or both sides with the activating compound.

The inside surface of the housing can include or be deposited with one or more ignition stripe. The ignition stripe(s) can be graphite for example. The ignition stripes improve the dynamic response of the arrester. The ignition stripes can have at least one characteristic selected from the group consisting of: (i) being made of at least one non-graphite material; (ii) being made of a pattern of dots; and (iii) including multiple stripes distributed at least one of axially and radially on the inner surface of the housing.

The housing can have at least one characteristic selected from the group consisting of: (i) housing the enclosed gas; (ii) being made of ceramic, glass or plastic; (iii) supporting at least one ignition stripe; (iv) being at least substantially cylindrical; and (v) being disposed on either side of an inner electrode.

In one implementation, the one or more electrode surface upon which the compound is applied includes depressions into which the compound is applied. The depressions can create a waffle-like surface, which is better able to hold the compound and can hold more compound. As alluded to before, the electrode, such as an end electrode, can be coated on one side with the activating compound. Alternatively, an inner electrode can be coated on multiple sides.

In another implementation, the electrodes are formed so that when attached to the housing(s), portions of two or more electrodes are spaced closely to one another to form an enclosed spark gap. Those portions can be coated with the activating compound. The close spacing of multiple surfaces having the compound also serves to improve the dynamic response of the arrester.

The electrodes can be made of any one or more suitable material, such as copper, nickel, nickel iron, or any combination thereof (e.g., alloyed, layered or plated).

The electrode upon which the compound is applied includes at least one characteristic selected from the group consisting of: (i) including depressions into which the compound is applied; (ii) having compound applied to one side of the electrode; (iii) having compound applied to multiple sides of the electrode; (iv) being formed so that a portion of the electrode is spaced closely to another one of the electrodes; and (v) being made of copper, nickel, nickel iron, any combination thereof, any layered combination thereof and any plated combination thereof.

The gas which fills the arrester can vary. The gas can be an inert gas, such as nitrogen, neon, krypton or argon or other generally non-reactive gas. The gas can alternatively be a reactive gas, such as hydrogen. The gas can be a mixture of reactive and non-reactive gases, such as any combination of hydrogen, nitrogen, neon, krypton and argon. The gas in one implementation is pressurized within the arrester as necessary depending on the required breakdown voltage (e.g., 14 psig to 40 psig). A vacuum can be applied initially to the arrester to remove air (nitrogen, oxygen and argon) before backfilling the arrester with the desired blend to the desired pressure.

The enclosed gas is of at least one type selected from the group consisting of: (i) an inert gas, (ii) a reactive gas, (iii) a pressurized gas, (iv) an evacuated gas, (v) a mixture of gases, (vi) hydrogen, (vii) silane, (viii) nitrogen, (viii) argon, (ix) neon, (x) krypton and, (xii) carbon dioxide, and (xiii) helium.

The activating compound can also vary. In one implementation the compound includes: (i) nickel powder in an amount of about 10% to about 35% by weight; (ii) potassium or sodium silicate in an amount of about 20% to about 60% by weight; (iii) titanium powder in an amount of about 5% to about 25% by weight; (iv) sodium carbonate in an amount of about 5% to about 15% by weight; and (v) cesium chloride in an amount of about 10% to about 20% by weight.

In another implementation the compound includes: (i) nickel powder in an amount of about 10% to about 35% by weight; (ii) potassium or sodium silicate in an amount of about 20% to about 60% by weight; (iii) titanium powder in an amount of about 5% to about 25% by weight; (iv) sodium carbonate in an amount of about 5% to about 15% by weight; and (v) sodium bromide in an amount of about 10% to about 20% by weight.

In a further implementation the compound includes: (i) nickel powder in an amount of about 10% to about 35% by weight; (ii) potassium silicate in an amount of about 30% to about 60% by weight; (iii) sodium bromide in an amount of about 20% to about 25% by weight; and (iv) calcium titanium oxide in an amount of about 5% to about 10% by weight.

In still another implementation the compound includes: (i) nickel powder in an amount of about 10% to about 35% by weight; (ii) potassium or sodium silicate in an amount of about 20% to about 60% by weight; (iii) titanium powder in an amount of about 5% to about 25% by weight; (iv) calcium titanium oxide in an amount of about 5% to about 15% by weight; and (v) sodium bromide in an amount of about 10% to about 20% by weight.

In still a further implementation the compound includes: (i) nickel powder in an amount of about 10% to about 35% by weight (e.g., 13.2%); (ii) potassium metasilicate in an amount of about 10% to about 20% by weight (e.g., 17.6%); (iii) aluminum silicon powder in an amount of about 5% to about 20% by weight (e.g., 13.2%); (iv) sodium carbonate in an amount of about 5% to about 20% by weight (e.g., 15.4%), and (v) cesium chloride in an amount of about 25% to about 45% by weight (e.g., 40.6%).

In yet another implementation the compound includes: (i) nickel powder in an amount of about 10% to about 35% by weight; (ii) potassium silicate in an amount of about 30% to about 60% by weight; (iii) sodium chloride in an amount of about 20% to about 25% by weight; and (iv) barium titanium oxide in an amount of about 5% to about 10% by weight.

Also discussed in more detail below are various systems for ink-jetting the above-mentioned ignition stripes onto an interior surface of the housing of the surge arrester. As described in detail below, the ignition stripes aid in the overall electrical performance of the surge arresters. Ink-jetting the stripes provides a multitude of advantages. For example, ignition stripes have typically been made of graphite, however, the ink-jetting system allows for the striping deposition of non-graphite materials. Other advantages include the flexibility, accuracy and repeatability that the microprocessor controlled systems provide.

The ink-jetting system can be a demand based system or a continuous system. In the demand based system, ink-jetting material is gravity fed or pumped into a nozzle, wherein the material is maintained at atmospheric pressure. The striping material within the nozzle or directly adjacent to the nozzle is placed in contact with an energy source, such as a piezoelectric transducer or electrical resistor, such as a thin film resistor. The nozzle defines an internal chamber having an orifice or opening. To produce a ink-jet droplet of striping material, the energy source transmits energy into the chamber of the nozzle. The added energy creates a gas bubble in the material and volumetrically forces a known quantity of striping material through the orifice, forming a droplet. The droplet is projected and/or gravity fed onto the inner surface of the arrester housing.

The energy source is electronically coupled to a microprocessor-based control system, which stores striping patterns or programs. The computer patterns dictate the frequency at which droplets exit the nozzle and the size of the droplets. In particular, the computer programs result in a data pulse, which is sent to a driver for the energy source. The driver converts the data pulse into a voltage pulse (e.g., on/off 0 to 5 VDC), which is sent to the energy source. The length or on-time of a particular pulse in an embodiment determines the size of the droplet. The time between leading edges of two adjacent pulses in an embodiment determines the frequency at which the droplets leave the orifice.

In an alternative embodiment, a continuous ink-jetting system is provided. Here, a continuous stream of striping material exists the nozzle. Immediately thereafter the material flows through a charging apparatus that vibrates the continuous stream into separate droplets. The charging apparatus also charges the separate droplets. After passing through the charging apparatus, the individual and charged droplets of striping material pass through high voltage deflection plates, which can cause the droplets to deflect in one direction or another relative to the plates. In this manner, the droplets can be deflected or not deflected onto to the inner surface of the insulative housing of the arrester. Or, the droplets can be deflected into a droplet collector, so that those droplets are not deposited on the inner surface of the arrester housing. The charging of the particles therefore controls the frequency at which droplets are deposited onto the housing.

With continuous ink-jetting the frequency at which droplets are deflected from the stream into the collector sets the frequency at which the remaining droplets are deposited onto the housing. The size of the droplets in the continuous system is determined by the size of the stream and the output level of the charging apparatus.

The demand and continuous ink-jetting systems each operate in tandem with a motion control system, which for example includes at least two motors configured to move the housing in two dimensions. In one embodiment one motor rotates the housing about a longitudinally extending orifice needle or tube, while a second motor translates the housing in a direction coaxial orifice needle or tube. Shown below is one example of such a system that employs two stepper motors, wherein one stepper motor is mounted to a block that is threaded or has one or more threaded component, which receives a threaded shaft or lead screw. The lead screw is coupled to a second motor. That second motor turns the lead screw to cause the block upon which the first motor is mounted to translate back and forth relative to the ink-jetting nozzle. The first motor mounted on the block is coupled to a holder that holds the housing removably fixed within the holder. The first motor is coupled to and can rotate the holder and thus the housing relative to the nozzle extending longitudinally into the housing. In the example illustrated below, the nozzle remains stationary, while the housing is moved in two dimensions relative to the nozzle.

Alternatively, one or both of the rotational or translational motion is provided via the ink-jetting apparatus. Here, the nozzle rotates or translates with respect to the insulative housing. For example, the ink-jetting apparatus can be configured to translate back and forth with respect to the arrester housing, while apparatus is provided to rotate the housing with respect to the ink-jetting nozzle. In this manner, the ink-jetting apparatus and the housing holding each provide a component to the overall motion control.

The microprocessor based systems operate one or more motion control program in conjunction with the ink-jetting pattern program discussed above to produce highly accurate and repeatable ink-jetting striping pattern. The striping material may be any suitable conductive or semiconductive material in liquid vehicle and binding agent, such as, black ink jet printer ink. These stripes can be axially, radially and/or diagonally disposed along the inner surface of the housing, such as a cylindrical housing. The stripes can be provided in any suitable quantity, arrangement and pattern. The stripes can be continuous (at least to the naked eye) or comprise multiple discernable smaller shapes, such as spots. The thickness of the stripes can also be controlled to a better extent than with traditional pencil striping systems. For example, the housing can be held steady, while multiple droplets are deposited at the same spot on the housing. The microprocessor based system enables custom striping patterns to be developed and tailored to specific arresters, having specific electrical performance characteristics.

Accordingly, in one embodiment a surge arrester is made via a process including the steps of: (i) providing an insulative housing; (ii) ink-jetting at least one ignition deposition onto an interior of the housing, the deposition including at least one non-graphite material; and (iii) enclosing the housing with at least one electrode, the electrode having an applied activating compound.

The process may include at least one additional step selected from the group consisting of: (i) attaching sections of the housing to either side of an inner electrode; (ii) pressurizing a gas within the housing; and (iii) evacuating the housing.

The deposition may be made of at least one material selected from the group consisting of: (i) graphite; (ii) copper powder dispersed in a liquid vehicle and binding agent; (iii) film resistor element ink; and (iv) conductive film inks diluted to increase resistivity.

Ink-jetting the at least one deposition can include at least one of: (i) heating the material; (ii) applying a voltage to the material; (iii) energizing the material; (iv) flowing the material through an opening; (v) deflecting the material; (vi) dispensing droplets of the material to produce a desired pattern of the droplets on the inslulative housing; and (vii) catching droplets in a reservoir that are not intended to be part of the deposition.

The process can include at least one further step of: (i) rotating the housing and (ii) translating the housing as the deposition is ink-jetted on the housing.

The activating compound includes at least one material selected from the group consisting of: nickel powder, potassium silicate, sodium silicate, titanium powder, sodium carbonate, cesium chloride, sodium bromide, lithium bromide, calcium titanium oxide, potassium metasilirate, aluminum silicon powder, and calcium titanium oxide.

In another embodiment, a surge arrestor is made via a process including the steps of: (i) providing an insulative housing; (ii) ink-jetting at least one ignition deposition onto an interior of the housing, the deposition including a pattern of droplets; and (iii) enclosing the housing with at least one electrode, the electrode having an applied activating compound.

The process can include at least one additional step selected from the group consisting of: (i) attaching sections of the housing to either side of an inner electrode; (ii) pressurizing a gas within the housing; and (iii) evacuating the housing.

The deposition is made of at least one material selected from the group consisting of: (i) graphite; (ii) copper powder dispersed in a liquid vehicle and binding agent; (iii) film resistor element ink; and (iv) conductive film inks diluted to increase resistivity.

Ink-jetting the at least one deposition includes at least one of: (i) heating the material; (ii) applying a voltage to the material; (iii) energizing the material; (iv) flowing the material through an opening; (v) deflecting the material; (vi) catching droplets in a reservoir that are not intended to be part of the deposition; (vii) using a droplet pattern sequence stored in a computer readable medium to produce the pattern; and (viii) dividing the pattern into grid locations and ink-jetting a number of droplets into each grid location of the pattern.

The process can include at least one further step of: (i) rotating the housing and (ii) translating the housing as the deposition is ink-jetted on the housing.

The process can include ink-jetting a plurality of depositions, each deposition including a desired pattern of droplets, the depositions spaced apart from one another to produce a desired pattern of depositions.

The housing can be at least substantially cylindrical, wherein the desired pattern of depositions includes at least one of: (i) a desired axial spacing and (ii) a desired radial spacing.

The deposition can be at least one of: (i) at least generally continuous due to a close spacing of the droplets; (ii) at least generally rectangular; (iii) formed as a line; (iv) axially extending along the housing, which is at least substantially cylindrical; and (v) formed from a plurality of discernable and separated shapes.

In a further embodiment a surge arrestor made via a process including the steps of: (i) providing an insulative housing; (ii) ink-jetting at least one ignition deposition onto an interior of the housing, the deposition including a pattern of spots, the spots each including a plurality of droplets; and (iii) enclosing the housing with at least one electrode, the electrode having an applied activating compound.

The spots are at least one of: (i) discernable with the naked eye; (ii) at least generally round and (iii) axially extending along the housing, which is at least substantially cylindrical.

It is therefore an advantage of the present invention to provide improved gas tube surge arresters.

It is another advantage of the present invention to provide improved activating compounds for gas tube surge arresters.

It is yet another advantage of the present invention to provide improved systems for applying ignition stripes to the housing of a gas tube surge arrester.

It is still a further advantage of the present invention to provide improved ignition stripes that are applied to the housing of a gas tube surge arrester.

Moreover, it is an advantage of the present invention to provide a system and method for applying ignition stripes to relatively smaller ceramic or other insulating bodies.

Additional features and advantages of the present invention are described in, and will be apparent from, the following Detailed Description of the Invention and the figures.

DETAILED DESCRIPTION

Figure 1:
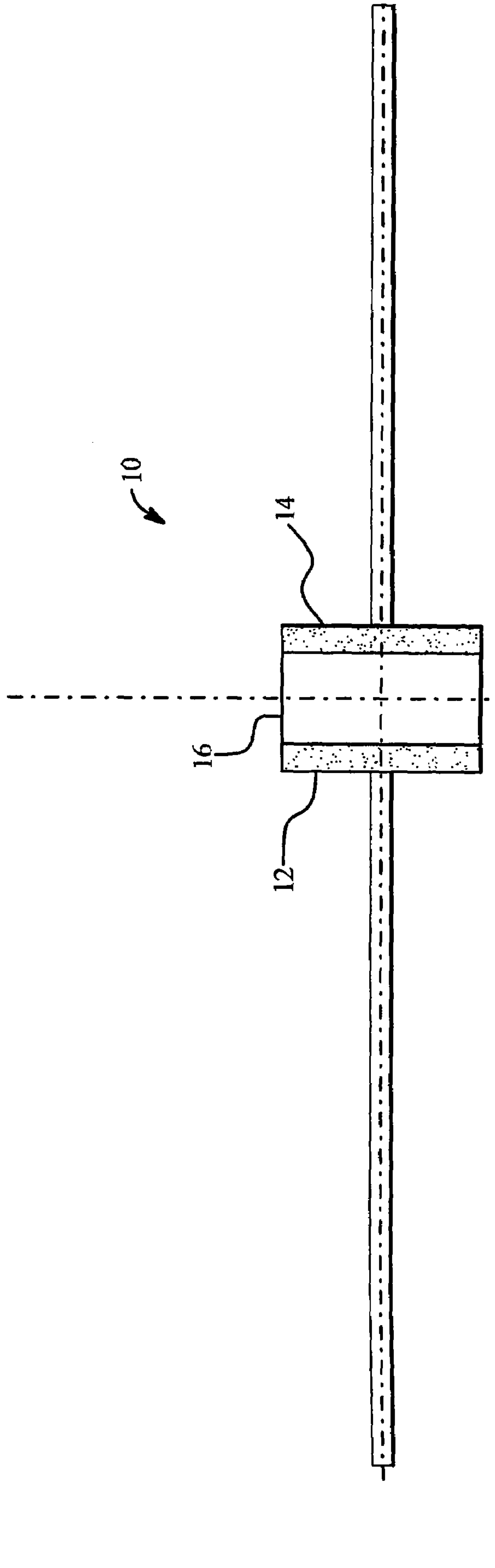
FIG. 1 (PRIOR ART)
FIG. 1 is an elevation view of a prior art example of a two electrode gas tube surge arrester.
Figure 2B:
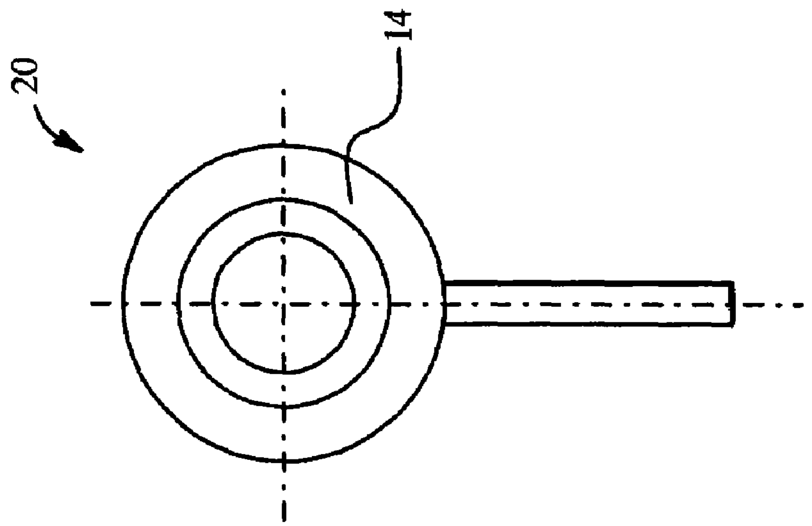
FIG. 2B (PRIOR ART)
FIGS. 2A and 2B are front and side elevation views of a prior art example of a three electrode gas tube surge arrester.
Figure 2A:
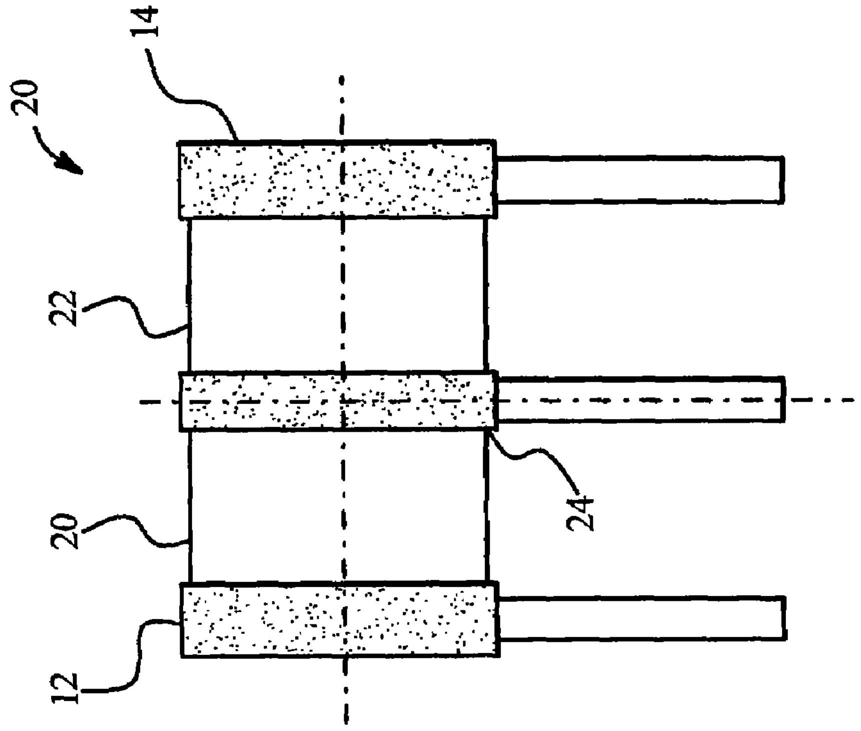
FIG. 2A (PRIOR ART)
Figure 3:
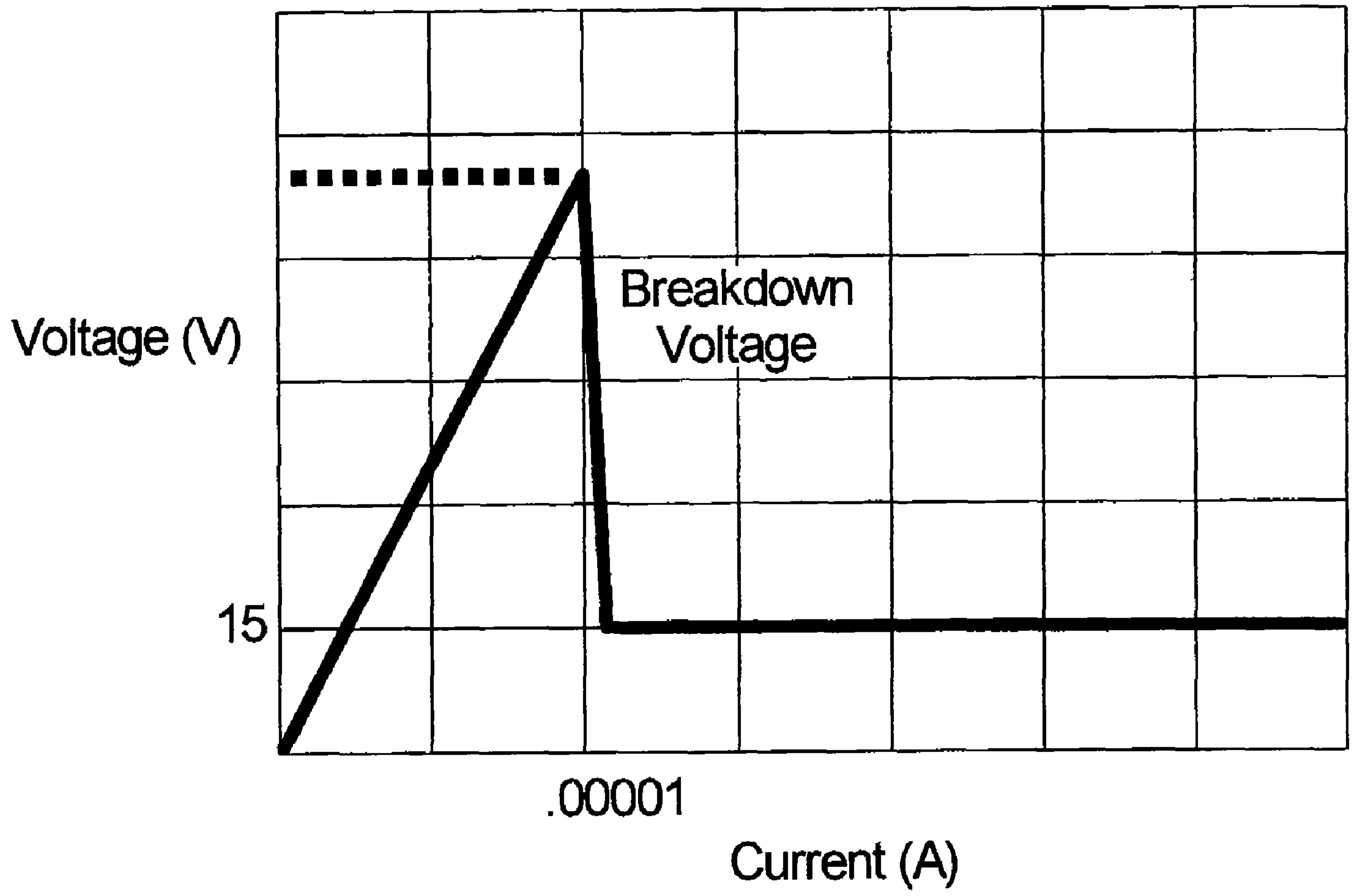
FIG. 3 is diagram illustrating one example of a voltage versus current curve for the gas tube surge arresters shown in FIGS. 4 to 6.

Referring now to the drawings and particularly to FIG. 3, a voltage vs. current curve for a gas tube surge arrester is illustrated. Under normal operation, the gas tube surge arrester is not conductive. For the gas tube surge arrester to become conductive, gas electrons within a sealed housing (shown below in FIGS. 4 to 6) must gain sufficient energy to initiate an ionization of gas (discussed below) stored within the sealed housing.

Complete ionization of, the gas takes place through electron collision. The events leading up to the complete ionization occur when the gas tube surge arrester is subjected to a rising voltage potential. Once the gas is ionized, breakdown occurs and the arrester changes from a high impedance state to a virtual short circuit, enabling the transient to be diverted to, e.g., ground, away from a protected part of the circuit. As seen in FIG. 3, the arc voltage or voltage across the gas tube surge arrester while the gas tube is conducting can be about 15 volts.

After the transient has passed, the gas tube surge arrester extinguishes itself and again becomes at least substantially an open circuit. The gas tube surge arrester is therefore resettable. To ensure arrester turn-off in alternating current ("AC") applications, the current through the arrester once the transient has passed must be less than the follow-on current rating of the gas tube surge arrester. The follow-on current requirement can be helped by placing an impedance in series with the arrester. In direct current ("DC") applications, the gas tube surge arrester is able to extinguish itself provided the device is operated within specified holdover test conditions, which involve the maximum bias voltage for a specified current that can appear across the gas tube surge arrester, while still allowing the gas tube surge arrester to be turned off.

The GDT's breakdown voltage shown in FIG. 3 is determined by electrode spacing, gas type (e.g., neon, argon, hydrogen as discussed below), gas pressure and the rate of rise of the transient. Breakdown voltage is generally considered to be the voltage at which the gas tube surge arrester changes from a high impedance state to a low impedance state. For example, the breakdown voltage can be 230V (+/−15%) when subjected to a voltage ramp of 500V/second. The arresters discussed below will experience breakdown at a higher voltage as the ramp rate of the transient increases.

The arresters discussed below have relatively rugged constructions, enabling the arresters to handle relatively high currents, e.g., greater than ten pulses of a 20,000 peak ampere pulse having a rise time of 8 microseconds decaying to half value in 20 microseconds (also referred to as an 8/20 wave form). The surge life of the arresters below can be about one thousand shots of a 500 ampere peak 10/1000 pulse. With a relatively low maximum inter-electrode capacitance, the arresters discussed below can typically be placed into RF circuits. The arresters are also well-suited to protect telephone circuits, AC power lines, modems, power supplies, CATV and other applications in which protection from large and/or unpredictable transients is desired.

Surge Arrester and Compounds

Figure 4:
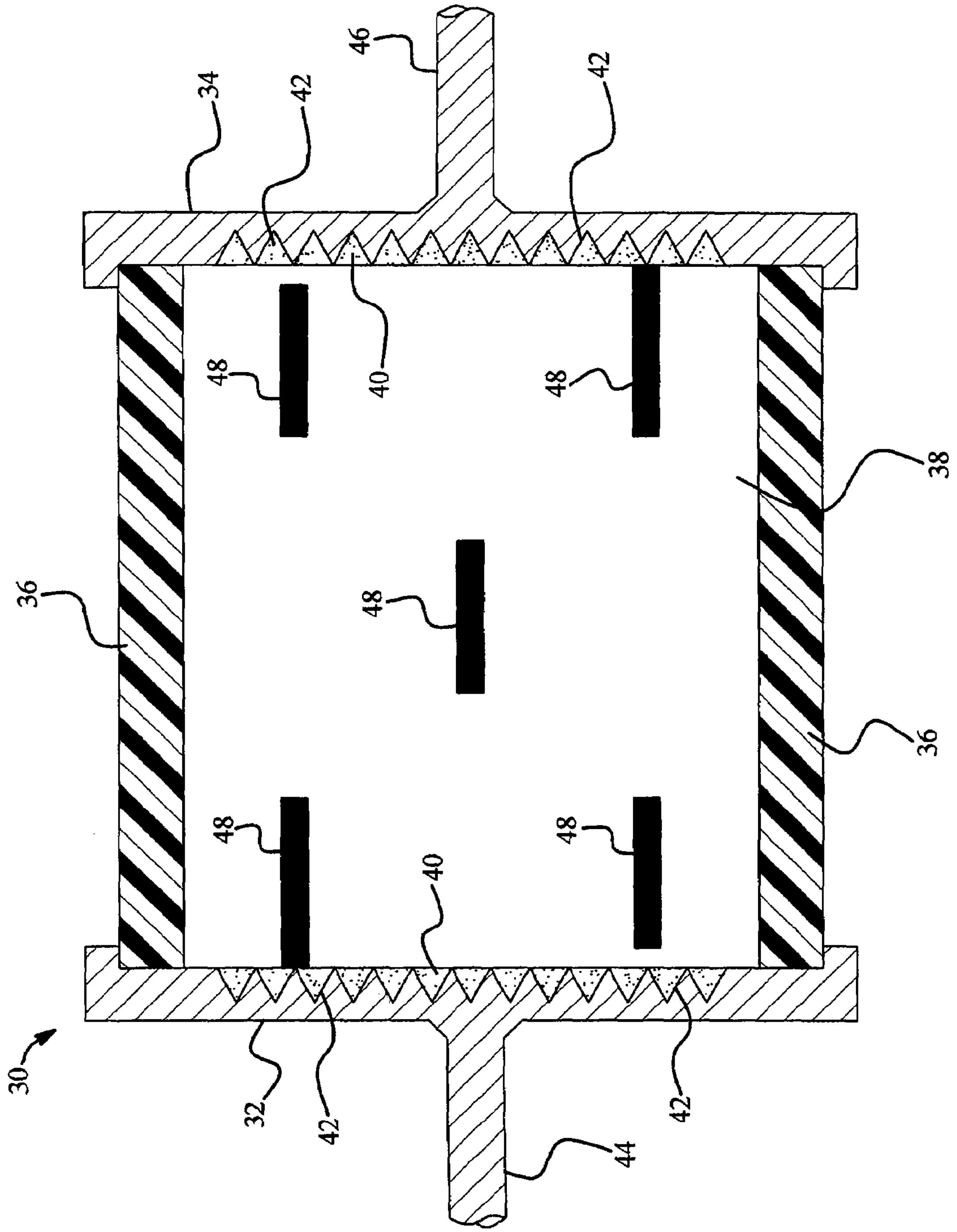
FIG. 4 is an elevation section view of one example of a two electrode gas tube surge arrester including ignition stripes and an activating compound.

Referring now to FIG. 4, one embodiment of a gas tube surge arrester is illustrated by arrester 30. Arrester 30 includes electrodes 32 and 34 coupled to an insulative housing 36. A gas 38 is filled (e.g., pressurized) into the housing enclosed by electrodes 32 and 34. An activating compound 40 is applied to at least one of electrodes 32 and 34. Under normal operation and normal operating voltages current cannot conduct from one electrode 32, 34 to another. Upon an overvoltage condition, the voltage reaches a breakdown point at which compound 40 is activated. A current is then able to pass through arrester 30. Activating compound 40 provides an electron source, which can vary depending on the level of surge, and which protects electrodes 32 and 34 from erosion during the surge. Consequently, electrodes 32 and 34 are able to withstand multiple surges within resettable arrester 30.

In the embodiment illustrated in FIG. 4, a single housing 36 is employed. Electrodes 32 and 34 are attached to, e.g., crimped, press-fit, soldered, adhered and/or brazed onto, each end of housing 36. In the illustrated embodiment, electrodes 32 and 34 include or are connected to leads 44 and 46, respectively, which enable arrester 30 to be placed electrically into a circuit, e.g., on a printed circuit board.

In one implementation, one or both electrodes 32 and 34 includes or defines a series of depressions or waffles 42 into which compound 40 is applied. Depressions 42 create a waffle-like surface, which is better able to hold compound 40 and can hold more compound 40 than a smooth surface. As illustrated, each electrode 32 and 34 is coated on its inner surface with activating compound 42.

The inside surface of housing 36 can include or be deposited with one or more ignition stripe 48. Ignition stripes 48 improve the dynamic response of arrester 30 by creating a field effect. Ignition stripes 48 are applied to housing 36 using a high resistivity conductive material. Typical ignition stripe(s) 48 can be graphite or carbon. Ignition stripes 48 extend the strong field effect produced at the electrodes 32 and 34 to increase the speed of generation of free charged particles in the gas, which then rapidly move under the influence of the electric field produced between a negative electrode or the cathode, e.g., electrode 32 and a positive electrode or anode, e.g., anode 34. Ignition stripe(s) 48 can be placed in a pattern as illustrated or in a row or multiple rows. As illustrated, certain of the stripes 48 can contact one of the electrodes 32 and 34, while others do not. Stripes 48 are spaced apart so that they do not form a conductive path between electrodes 32 and 34.

One preferred method for depositing ignition stripes 48 onto housing 36 is discussed below in connection with FIGS. 7 to 17.

Figure 5:
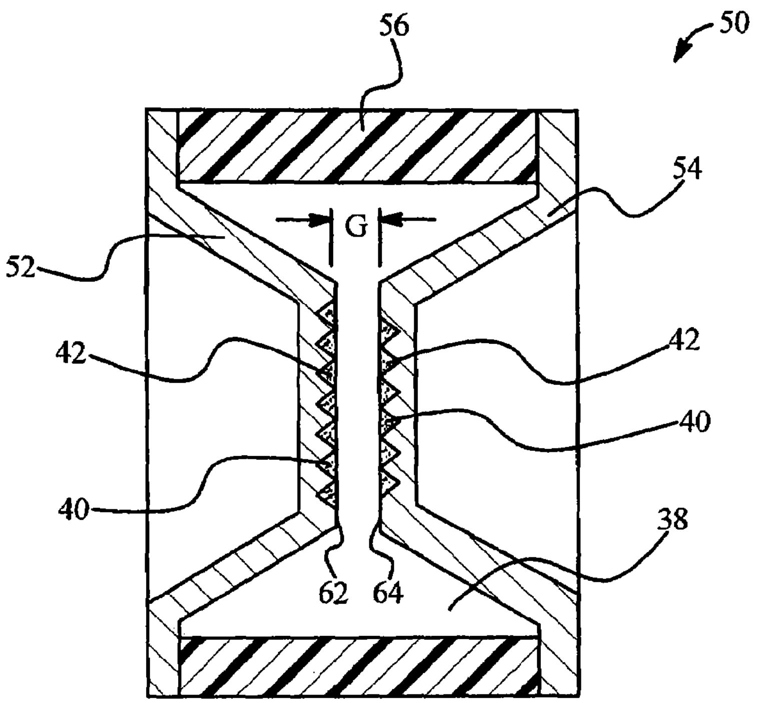
FIG. 5 is an elevation section view of one example of a two electrode gas tube surge arrester including formed electrodes and an activating compound.

Referring now to FIG. 5, an alternative gas tube surge arrester 50 is illustrated. Here, electrodes 52 and 54 are formed so that when fixed to housing 56, portions 62 and 64 of electrodes 52 and 54, respectively, are spaced closely to one another. In one implementation, a gap distance G between portions 62 and 64 is about 0.5 mm to about 1.5 mm. Portions 62 and 64 include depressions or waffles 42 discussed above, into which activating compound 40 is placed.

The close spacing of multiple surfaces having the compound improves the dynamic response of arrester 50. In the illustrated embodiment, arrester 50 does not include ignition stripes 48. Alternatively, arrester 50 includes one or more ignition stripe 48.

Figure 6:
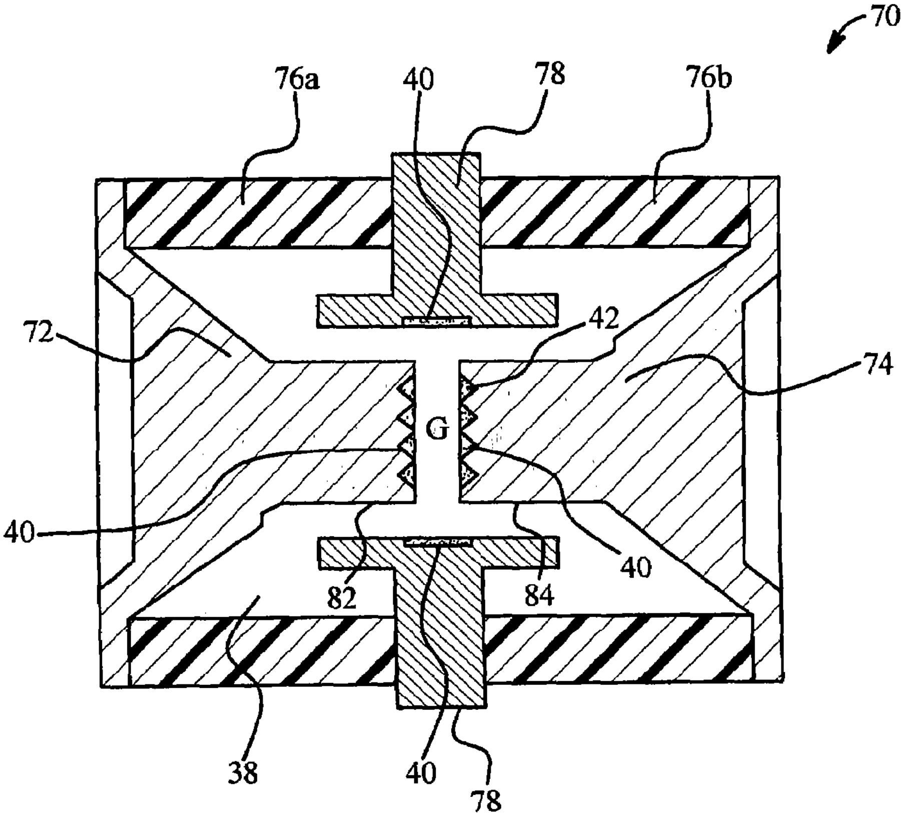
FIG. 6 is an elevation section view of one example of a three electrode gas tube surge arrester including formed electrodes and an activating compound.

Referring now to FIG. 6, a further alternative gas tube surge arrester 70 is illustrated. Here, arrester 70 includes end electrodes 72 and 74 and an, e.g., tubular, central electrode 78, which is fixed via any of the methods described above to the inner ends of two insulative housings 76*a* and 76*b*. End electrodes 72 and 74 are likewise fixed to the outer ends of housings 76*a* and 76*b*.

As with arrester 50, electrodes 72 and 74 are formed so that when fixed to housings 76*a* and 76*b*, portions 82 and 84 of electrodes 72 and 74, respectively, are spaced closely to one another. In one implementation, portions 82 and 84 are spaced apart a gap distance G described above. Portions 82 and 84 include depressions or waffles 42 discussed above, into which activating compound 40 is placed.

Central electrode 78 is provided with an annular recess, into which additional activating compound 40 is placed, which can be the same or different compound 40 placed in portions 82 and 84 and/or in the single-gap arresters 30 and 50 of FIGS. 4 and 5. The annular recesses of central electrode 78 may also include depressions or waffles 42 discussed above.

Housings 36, 56 and 76*a*/76*b* of arresters 30, 50 and 70, respectively, can be made of any suitable insulating material, such as ceramic, glass, plastic or any suitable combination thereof. Housings 36, 56 and 76*a*/76*b* can be at least generally cylindrical or of any suitable shape that can withstand a pressurized gas. To that end, the housing 36, 56 and 76*a*/76*b* are made to have a thickness capable of holding pressurized gas 38.

Electrodes 32/34, 52/54 and 72/74/78 of arresters 30, 50 and 70, respectively, can be made of any one or more suitable material, such as copper, nickel, nickel iron, or any combination thereof (e.g., alloyed, layered or plated). Electrodes 32/34, 52/54 and 72/74 can have any suitable shape or lead arrangement for connecting to an external circuit, such as on a printed circuit board. Alternatively, arresters 30, 50 and 70 can be configured to plug into a socket or other connection device.

The gas 38 which fills arresters 30, 50 and 70 can vary. Gas 38 can be an inert gas, such as nitrogen, neon, krypton or argon or other generally non-reactive gas. Gas 38 can be a reactive gas, such as hydrogen. Gas 38 can be a mixture, such as any combination of hydrogen, nitrogen, neon, krypton, argon. Gas 38 in one implementation is pressurized, e.g., from 14 psig to 40 psig. Air originally within the arresters can be evacuated first before gas 38 is backfilled into the arresters to the desired pressure.

The activating compound 40 for any of the above-described arresters 30, 50 and 70 can also vary. In one implementation compound 40 includes: (i) nickel powder in an amount of about 10% to about 35% by weight; (ii) potassium or sodium silicate in an amount of about 20% to about 60% by weight; (iii) titanium powder in an amount of about 5% to about 25% by weight; (iv) sodium carbonate in an amount of about 5% to about 15% by weight; and (v) cesium chloride in an amount of about 10% to about 20% by weight.

In another implementation compound 40 includes: (i) nickel powder in an amount of about 10% to about 35% by weight; (ii) potassium or sodium silicate in an amount of about 20% to about 60% by weight; (iii) titanium powder in an amount of about 5% to about 25% by weight; (iv) sodium carbonate in an amount of about 5% to about 15% by weight; and (v) sodium bromide in an amount of about 10% to about 20% by weight.

In a further implementation compound 40 includes: (i) nickel powder in an amount of about 10% to about 35% by weight; (ii) potassium silicate in an amount of about 30% to about 60% by weight; (iii) sodium bromide in an amount of about 20% to about 25% by weight, and (iv) calcium titanium oxide in an amount of about 5% to about 10% by weight.

In still another implementation compound 40 includes: (i) nickel powder in an amount of about 10% to about 35% by weight; (ii) potassium or sodium silicate in an amount of about 20% to about 60% by weight; (iii) titanium powder in an amount of about 5% to about 25% by weight; (iv) calcium titanium oxide in an amount of about 5% to about 15% by weight; and (v) sodium bromide in an amount of about 10% to about 20% by weight.

In still a further implementation compound 40 includes: (i) nickel powder in an amount of about 10% to about 35% by weight (13.2%); (ii) potassium metasilicate in an amount of about 10% to about 20% by weight (17.6%); (iii) aluminum silicon powder in an amount of about 5% to about 20% by weight (13.2%); (iv) sodium carbonate in an amount of about 5% to about 20% by weight (15.4%), and (v) cesium chloride in an amount of about 25% to about 45% by weight (40.6%).

In yet another implementation compound 40 includes: (i) nickel powder in an amount of about 10% to about 35% by weight; (ii) potassium silicate in an amount of about 30% to about 60% by weight; (iii) sodium chloride in an amount of about 20% to about 25% by weight; and (iv) barium titanium oxide in an amount of about 5% to about 10% by weight.

According to the above-described activating compounds 40, actual igniting and extinguishing properties of the surge arrester are at least substantially ensured by the [potassium silicate, sodium silicate or potassium metasilirate component] combination with gas filling 38, e.g., a gas filling 38 including hydrogen. Other components, such as cesium chloride and sodium bromide in combination with sodium carbonate and calcium titanium oxide stabilize the DC sparkover voltage. The nickel powder component helps to guarantee good extinguishing behavior before and after loading. Cesium chloride and sodium bromide (halides) used with a oxidizing agent, such as sodium carbonate, calcium titanium oxide or barium titanium oxide help to eliminate breakdown voltage delays during "dark" testing/storage. The halides in essence eliminate the need of radio-activity for a pre-ionization source, such as tritium.

Titanium and aluminum powder, both transitional metals or oxygen getters, are readily oxidized by the above agents, at temperature, during brazing, which then acts as an electron source, e.g., $$CaTiO_3=(CaO+TiO_2)Ti+CaO\ Ca+TiO_2$$

The sodium or potassium silicates are water glasses that act as a binder to hold the other elements together, before and after furnacing.

Surge arresters 30, 50 and 70 each have a good current-carrying capacity under alternating current, e.g., 60 times 1A, 1000 volts AC, 1 second duration and under unipolar pulsed current, e.g., 1500 times 10A, wave 10/1000 microsecond even at temperatures to, e.g., −40° C. to +65° C., while maintaining a low sparkover surge voltage, e.g., at 100 volts/microsecond lower than 600V, a constant extinguishing voltage and a constant DC sparkover voltage.

Ignition Stripes and Ink Jetting of Same

Figure 7:
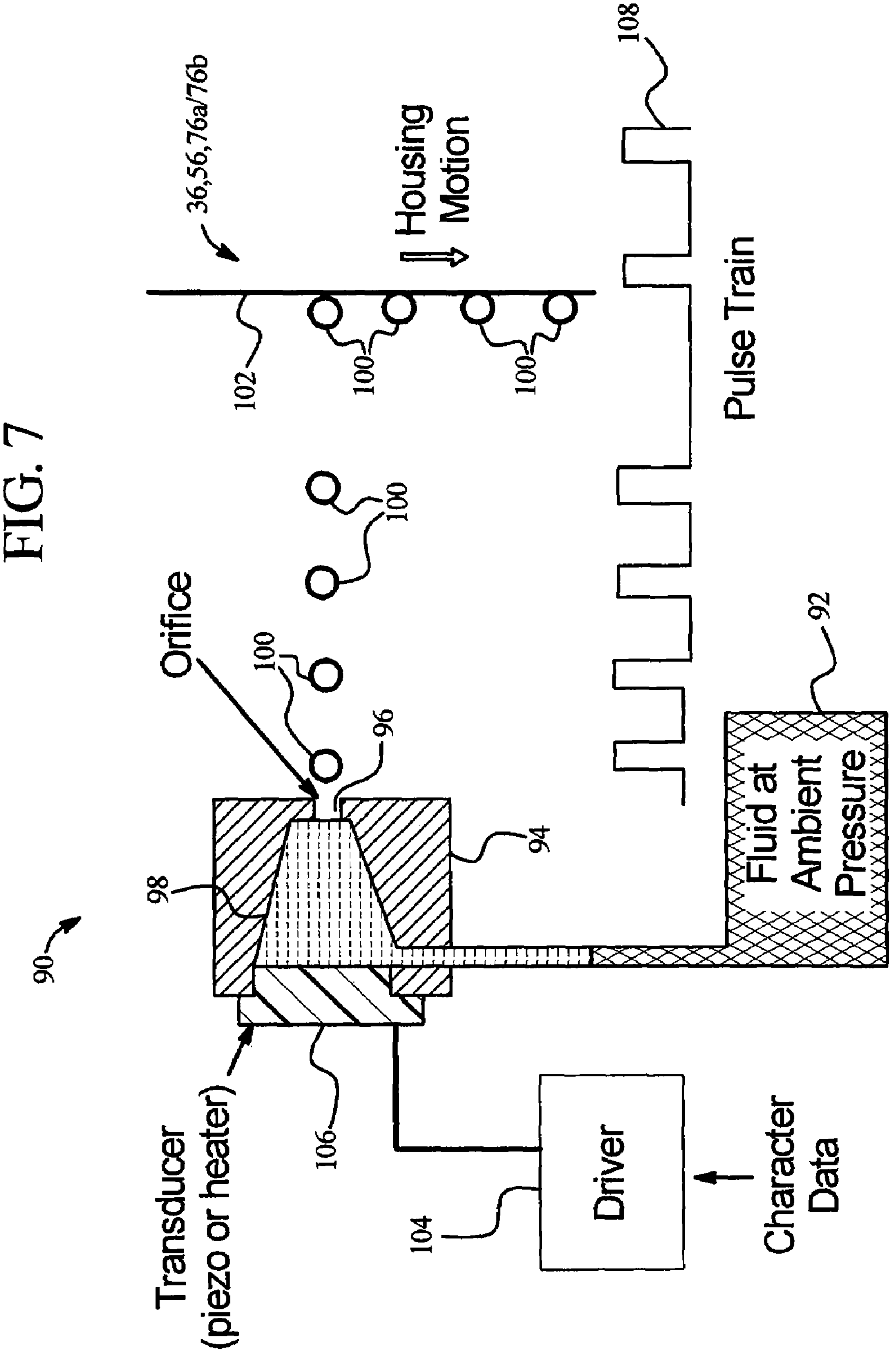
FIG. 7 is schematic view of one embodiment for a demand mode ignition stripe ink-jetting system.
Figure 8:
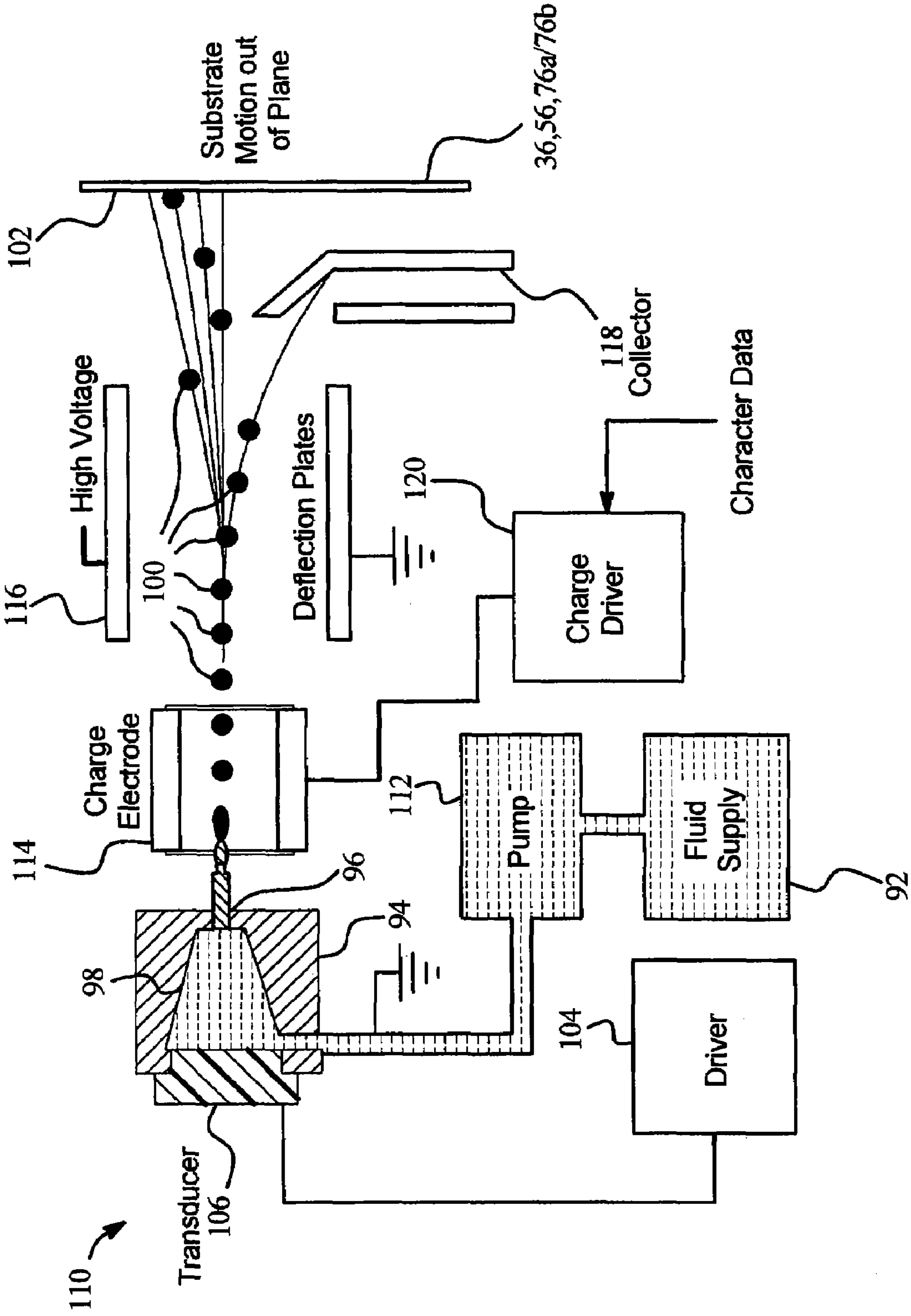
FIG. 8 is schematic view of one embodiment for a continuous mode ignition stripe ink-jetting system.

Referring now to FIGS. 7 and 8, two embodiments of ink-jetting ignition stripe systems are illustrated. FIG. 7 illustrates a demand mode ignition striping system 90. Demand mode system 90 supplies ignition striping material from a source 92. In one embodiment, striping material from source 92 is maintained under ambient pressure. In such case, striping material is, e.g., gravity fed from source 92 to a nozzle 94. Alternatively, striping material within reservoir 92 is pressure fed from source 92 to nozzle 94. Here, striping material within nozzle 94 is able to reach atmospheric pressure before being acted upon by a force, which causes nozzle 94 to eject droplets in a discrete volume.

In either system 90 or 110, the material for droplets 100 and stripes 48 in one embodiment includes graphite. Advantageously however, the material is not limited to graphite and instead can include any suitable conductive or semiconductive non-graphite materials, such as copper powder dispersed in a liquid vehicle and binding agent. Inks used to form film resistor elements would also be suitable for droplets 100 and stripes 48. Further, conductive film inks diluted to increase the resistivity of the material could be suitable for droplets 100 and stripes 48.

As illustrated, nozzle 94 defines or includes an orifice 96 and a nozzle chamber 98. Droplets 100 of striping material exit nozzle chamber 98 and orifice 96 and are deposited onto an inner surface 102 of one of the housings 36, 56 and **76*a*/76*b* discussed above (for convenience housings 36, 56 and 76*a*/76*b* are hereafter referred to as housing 36. Also, inner surface 102 is illustrated for convenience as being straight with respect to the direction of motion of inner surface 102 of housing 36. As shown above, housing 36 in an embodiment is at least substantially cylindrical. Inner surface 102 can therefore instead be at least substantially cylindrical, wherein the direction of motion (shown by the arrow) is a rotational direction, when deploying a radially extending stripe 48 or the width of an axially extending stripe. With a cylindrical housing, inner surface 102 in the direction of motion is at least substantially straight when translating the housing 36 to deploy an axially extending stripe 48. System 90** as shown below can deploy, radially, axially or diagonally extending stripes.

Formation of droplets 100 for demand mode system 90 of FIG. 7 includes a volumetric change in the striping material within nozzle chamber 98 of nozzle 94. In the illustrated embodiment, the volumetric change in the striping material is induced by a voltage pulse provided by driver 104 to an energy source 106, which is coupled with, e.g., adhered, welded, fastened to or pressed within, nozzle 94 such that energy source 106 is in contact with the ignition striping material. Energy source 106 can be a piezoelectric transducer or a resistor, such as a thin film resistor, both of which transfer energy to the material located within chamber 98. Energy source 106 can be one or more of a thermal, ultrasonic or radio frequency energy source.

System 90 includes a microprocessor (not illustrated), which operates with a memory, such as a random access memory ("RAM") or read only memory ("ROM"), which stores one or more ignition striping pattern. Upon a command to execute for example: (i) one of the patterns, (ii) one of the patterns multiple times or (iii) two or more patterns in sequence, the microprocessor recalls the appropriate one or more pattern from memory and runs the pattern. The microprocessor sends data making up the pattern, e.g., striping character data, to driver 104. Driver 104 converts the data into voltage pulses, represented schematically by pulse train 108 in FIG. 7, seen at energy source 106 as appropriate so that energy source 106 energizes the striping material within chamber 98 to produce droplets 100 at the required time and frequency.

In an embodiment, demand system 90 can produce droplets 100 in a frequency range of zero hertz ("Hz") to 25,000 Hz. Varying the time between the leading edges of the pulses of pulse train 108 varies the frequency of droplets in system 90. Also, in an embodiment, system 90 can produce droplets 100 in an average diameter range of 15 to 150 μmeters. The time that a given pulse is positive, i.e., the time during which positive voltage is applied to energy source 106 for the pulse, varies the size of the droplets 100 in system 90.

System 90 is advantageous in one respect because the striping patterns, e.g., the ones shown below in connection with FIGS. 10 to 15, can be formed and stored digitally, making pattern formation, e.g., via computer aided design ("CAD"), capable of being downloaded directly via a microprocessor to driver 104. The stored patterns also create highly accurate and repeatable patterns of ignition stripes 48 on surface 102 of housing 36. The flexibility of CAD also improves the ability to tailor one or more particular ignition stripe pattern for a particular application.

Demand jetting of system 90 of FIG. 7 is advantageous in another respect because all or almost all droplets 100 generated are used, virtually eliminating wasted ignition striping material. Reducing waste may have environmental as well as cost benefits depending upon the material used for ignition stripes 48.

Because mechanical control of droplets 100 in system 90 occurs at nozzle 94 via the energy input from source 106, it is desirable to maintain the pressure of the striping material within chamber 98 of nozzle 94 at atmospheric pressure before being energized by source 106. This way, the gas bubble or volumetric change formed within chamber 98 of nozzle 94 due to source 106 does not have to fight a positive material pressure. On the other hand, the ambient pressure storage of the striping material may cause system 90 to be slower than a continuous system 110 discussed next in connection with FIG. 8.

Referring now to FIG. 8, continuous system 110 supplies ignition striping material again in a reservoir or source 92. Here, striping material within reservoir 92 is pressure fed via pump 112 from source 92 to nozzle 94. Pump 112 may be any suitable liquid pump, such as a positive displacement or peristaltic pump. Striping material within nozzle 94 is maintained at a positive pressure until exiting chamber 98 through orifice 96 of nozzle 94.

Droplets 100 of a designated size (e.g., 20 to 500 microns) are again deposited on an inner surface 102 of housings 36. The axis of motion of surface 102 is out of the page in FIG. 8. Again, surface 102 is illustrated for convenience as being at least substantially straight. If housing 36 is cylindrical given the axis of motion of FIG. 8, surface 102 will alternatively be curved in FIG. 8 when translating housing 36 to deploy: (i) the length of an axially extending stripe 48 or (ii) the width of a radially extending stripe. Inner surface 102 will be at least substantially straight as shown in the view of FIG. 8 when rotating housing 36 to (i) deploy the length of a radially extending stripe 48 or (ii) the width of an axially extending stripe.

In continuous system 110, the striping material liquid exists orifice 96 of nozzle 94 as a continuous stream. The continuous stream of material passes through a charging electrode system that creates pressure oscillations of constant frequency. The oscillations separate the material stream into uniform droplets, which can be formed in significantly higher frequencies than with demand system 90. In particular, the stream enters an electrostatic field or charging field 114, which separates and charges the droplets 100. A second high voltage field or deflection field 116 directs the droplets 100 to (i) a desired portion of surface 102 or (ii) as desired into a droplet collector 118.

System 110 also includes a microprocessor (not illustrated), which operates with a memory, such as a random access memory ("RAM") or read only memory ("ROM"), which stores one or more ignition striping pattern. Upon a command to execute for example: (i) one of the patterns, (ii) one of the patterns multiple times or (iii) two or more patterns in sequence, the microprocessor recalls the appropriate one or more pattern from memory and runs the pattern. Data making up pattern, e.g., character data, are sent to a charge driver 120. Driver 120 converts the data into positive or negative charges of varying amounts. Driver 120 communicates with the charging field or charge electrode 114, which applies the desired charge to the droplets 100 formed within the charge electrode 114. The particular charge, when acted upon by deflection field 116, determines whether the corresponding droplet 100 will be deposited on a particular part of surface 102 or be sent instead to droplet collector 118.

In an embodiment, system 110 can produce droplets 100 in a frequency range of zero hertz ("Hz") to one MHz. Driver 104 and transducer 106 drive the drops and control their frequency. Also, in an embodiment, system 90 can produce droplets 100 in an average diameter range of about 20 to about 500 microns. In an embodiment, the size of the particles is determined by the size of the stream exiting nozzle 94, which is in turn determined by the amount of energy applied by driver 104 and energy source 106 to the striping fluid within chamber 98 of nozzle 94.

System 110 is also advantageous because the striping patterns, e.g., the ones shown below in connection with FIGS. 10 to 15, can be formed and stored digitally, making CAD drawn patterns able to be downloaded directly via a microprocessor to charge driver 120. The stored patterns also create highly accurate and repeatable patterns of ignition stripes 48 on surface 102 of housing 36. The flexibility of CAD also improves the ability to tailor one or more particular ignition stripe pattern for a particular application.

One suitable apparatus for system 90, 110 is provided by MicroFab Technologies, Inc, Plano, Tex. and marketed under the name Jetlab®.

Figure 9:
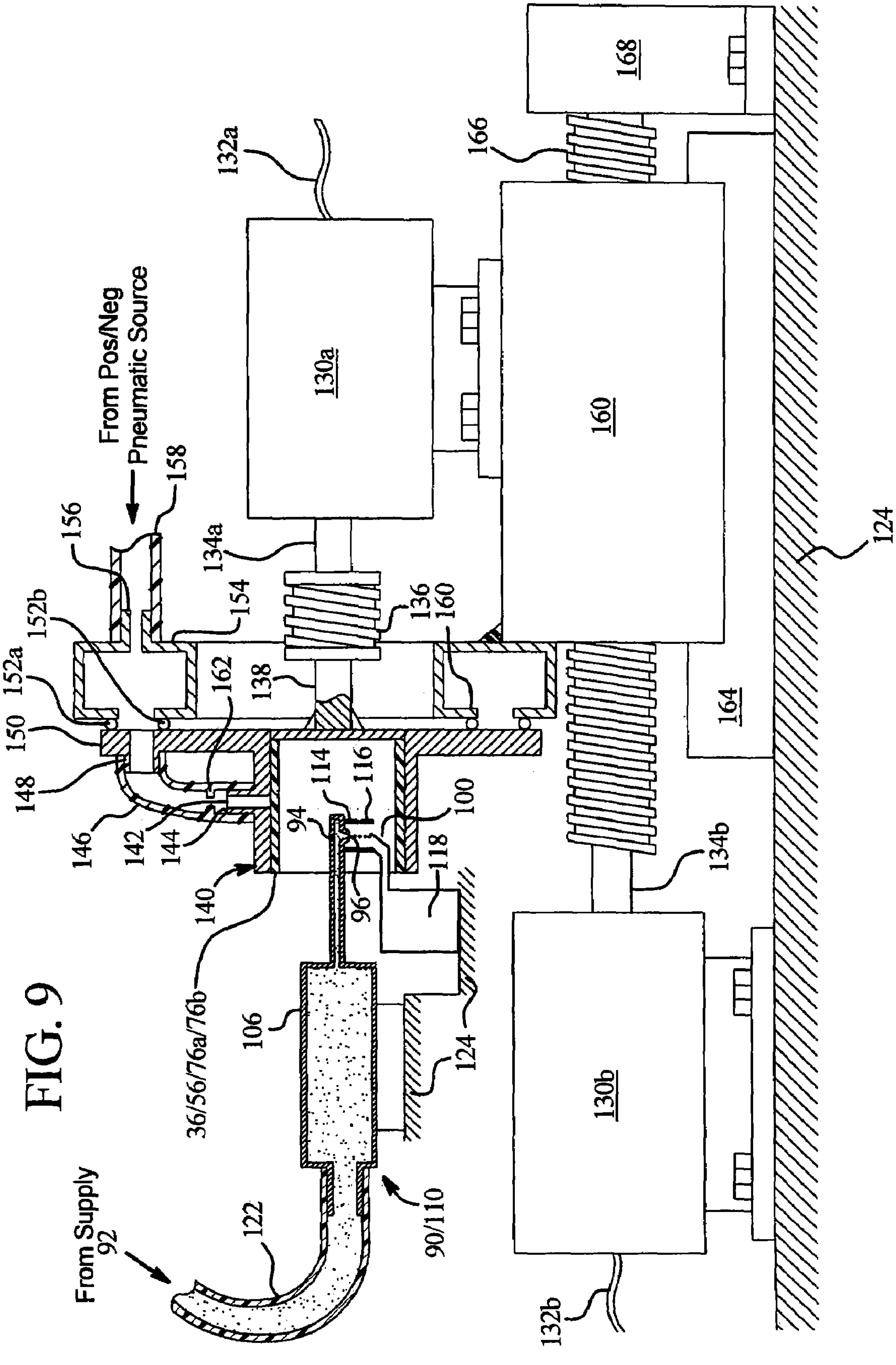
FIG. 9 is a side elevation view showing one embodiment of motion control equipment used with the systems of FIGS. 7 and 8.

Referring now to FIG. 9, an embodiment of the motion control equipment useable with systems 90 and 110 to produce the axially, radially and/or diagonally extending ignition stripes 48 and associated patterns is illustrated. For reference, certain components from system 90 and 110 shown and described above in connection with FIGS. 7 and 8 are shown again in FIG. 9. In particular, energy source or transducer 106 is shown fixed to a mechanical ground 124. Ignition striping material is gravity fed or pumped from supply 92 through a tube 122 to transducer 106. Transducer or energy source 106 contacts and heats or otherwise adds energy to the striping material as described above.

In the illustrated embodiment, nozzle 94 includes a thin tube, e.g., which extends horizontally. At its distal end nozzle 94 defines an orifice 96 through which droplets 100 are projected. In the illustrated embodiment, droplets 100 are projected downwardly to take advantage of gravity. In an alternative embodiment, droplets 100 are project laterally, upwardly or at any other desired angle relative to a horizontal axis. In still another alternative embodiment, nozzle 94 defines multiple orifices 96 (located in-line or spaced radially apart), enabling parallel production of droplets 100 and stripes 48.

The apparatus of FIG. 9 may be used with either demand mode system 90 or continuous mode system 110 as desired. For clarity, charge electrode 114 and high voltage deflection plates 116 are shown. Those apparatuses are coupled to mechanical ground 124 via droplet collector 118 in the illustrated embodiment. Charge electrode 114 and high voltage deflection plates 116 can alternatively be coupled or held in place independently if desired. It should be appreciated that in demand mode system 90, charge electrode 114, high voltage deflection plates 116 and droplet collector 118 are not used.

Housing 36 (referring again collectively to housings 36, 56, 76A/76B) is rotated to produce the length of radially extending ignition stripes 48 or the width of axially extending ignition stripes 48 via motor 130*a*. Housing 36 is translated to produce the length of axially extending ignition stripes 48 or the width of radially extending stripes 48 via motor 130*b*. Motors 130*a* and 130*b* in one embodiment are stepper or DC servo type motors, which can be controlled very accurately. Cables 132*a* and 132*b* extend from motors 130*a* and 130*b*, respectively, to drivers (not illustrated). The drivers in turn receive pulsed or on/off voltage signals produced via an executed motion control program stored in a computer memory. The CAD automation for the production of droplets 100 is combined with automated motion control programs for motors 130*a* and 130*b* to yield an overall computer controlled, highly accurate and repeatable striping system 90 or 110.

Motors 130*a* and 130*b* each include an output shaft 134*a* and 134*b*, respectively. Output shaft 134*a* is coupled via coupler 136 to a shaft 138 of a housing holder 140. Coupler 136 in the illustrated embodiment is flexible so as to allow slight misalignment between output shaft 134*a* and shaft 138 of housing holder 140. The flexible nature of coupler 136 also helps to reduce backlash, which is a positional error associated with high precision stepper or servo type motors (a similar coupler 136 can be used with the rotational to translational ball or lead screw used with motor 130*b* to reduce backlash).

Housing holder 140 is constructed to hold housing 36 firmly but removably. In the high-output automated system 90, 110, housing 36 is readily inserted into and removed from holder 140. In the illustrated embodiment, a plunger 142 is held slidingly inside a port 144 of holder 140. Port 144 is attached to a tube 146. Tube 146 at its other end connects to a second port 148 extending from a flange 150 of holder 140. An aperture through port 148 extends through the back of flange 150. The back of flange 150 seals via o-rings 152*a* and 152*b* to a non-rotating pneumatic plenum 154. Plenum 154 defines or includes a port 156, which is attached sealingly to a tube 158 extending from a positive and negative pneumatic source. Plenum 158 as illustrated is fixed to and translates with block 160. Motor 130*a* as illustrated is likewise fastened to and translates with block 160.

In the illustrated embodiment, to fix housing 36 removably within holder 140, positive pressure is applied from the source, through tube 158 and into plenum 154, which creates a ring of pressurized air. That ring of pressurized air also extends through port 148 of flange 150 and into tube 146, pushing plunger 142 against the outer surface of housing 36, forcing the housing against the opposing inner wall of holder 140. It should be appreciated that while a single plunger 142 is shown for convenience, multiple such plungers may be provided and spaced apart about the housing (e.g., evenly at 45°, 90° or 180° from each other as determined by the total number of plungers 142, ports 144, 148 and tubes 146 used).

As flange 150 of holder 140 is rotated about the horizontal axis of output shaft 134*a* of motor 130*a*, the aperture or port 148 is maintained in pneumatic communication with the pressurized air within plenum 154 due to a circular opening 160 defined by the surface of plenum 154 facing flange 150. O-rings 152*a* and 152*b* seal about either side of circular opening 160 to maintain the integrity of the positive and negative pressures maintained at different times within plenum 154.

When the ignition striping for a particular housing 36 is completed, the pneumatic source switches and evacuates plenum 154 and above-described associated pneumatic system, pulling plunger 142 (or multiple plungers 142) away from the housing. A stop 162 may be provided inside tube 146 so that plunger 142 becomes seated away from but near the cylindrical holding portion of holder 140. With plunger 142 pulled away from housing 36, the housing can be readily removed from holder 140 via a mechanical and/or pneumatic removing apparatus (not illustrated). The plenum 154 and mating flange 150 of holder 140 it should be appreciated provide a pneumatic slip-ring, which enables a constant positive or negative pressure to be applied to plunger 142 as the plunger and holder 140 are rotated via motor 130*a*.

As discussed above, motor 130*a* is coupled to sliding block 160. Sliding block 160 slides within a pair of guides 164 (one shown) connected to mechanical ground 124. Sliding block 160 includes or defines a threaded opening, which accepts threaded shaft 166. Threaded shaft or ball screw 166 is coupled at one end (e.g., via a suitable coupler) to output shaft 134*b* of motor 130*b*. Motor 130*b* as illustrated is also fixed to mechanical ground 124. Threaded shaft or ball screw 166 as illustrated is fixed at its other end rotatably to a bearing or pillow block 168. Bearing or pillow block 168 is likewise fixed to mechanical ground 124.

As motor 130*b* spins, output shaft 134*b* and threaded shaft or ball screw 166 turn clockwise or counterclockwise. That rotation in combination with the threaded engagement between shaft 166 and the threaded hole of block 160 causes block 160 to translate towards or away from nozzle 94 depending on the direction of rotation of motor 130*b*. The rotational to translational motion conversion controls the translational motion of holder 140, 36 held in holder 140 high accurately and repeatably with respect to fix nozzle 94 and orifice 96 of nozzle 94. This translational positioning system is used to deposit ignition stripes 48 repeatedly and accurately via droplets 100 of ignition striping material existing orifice 96 to set: (i) the length of a translationally or axially extending stripe 48 or (ii) the thickness of a radially extending stripe 48 on the interior of housing 36.

At the same time or at different times, highly accurate and repeatable motor 130*a* precisely controls the rotational motion and position of holder 140 and housing 36 held removably fixed therein via the pneumatic apparatus described above. Such highly accurate and repeatable rotational motion and positioning of the housing with respect to fixed nozzle 94 and associated orifice 96 enables ignition stripes 48 to be disposed highly accurately, repeatably and radially within the housing to set: (i) the thickness of an axially or translationally extending stripe 48 or (ii) the length of a radially extending stripe.

It should also be appreciated that the apparatus disclosed in connection with FIG. 9 can be configured and programmed to rotate motors 130*a* and 130*b* simultaneously or sequentially to dispense or deposit diagonally (axially and radially) extending stripes 48. The motion control apparatus of FIG. 9 in combination with the demand and continuous mode ignition striping of deposition systems 90 and 110 described above provide a highly flexible, automated, repeatable and accurate system for depositing ignition stripes 48 in a variety of patterns and directions on the interior of housing 36.

It should be appreciated that at least a portion of the motion control could alternatively move nozzle 94 with respect to housing 36 as opposed to purely moving housing 36 with respect to a stationary nozzle 94. For example, energy source 106 and nozzle 94 could be mounted to a translating block similar to block 160, which translates via the ball screw arrangement with respect to housing 36 and holder 140, which would be at least held translationally fixed.

Referring now to FIGS. 10 to 15, various examples of striping patterns are illustrated produced via the above-described apparatus are illustrated. It should be appreciated that the patterns of FIGS. 10 to 15 are for illustration purposes only, serve as examples, and in no way limit the scope and spirit of the claims appended hereto. Each of the patterns in FIGS. 10 to 15 show a housing, such as housing 36, as if the housing had been cut along an axial line at 0° or 360° and opened into a flat. FIGS. 10 to 15 in particular show the inner surfaces of housings 36 in the flat. It should be appreciated that while housing 36 is shown for simplicity, the same patterns or similar patterns may be applied to the other housing discussed above, such as housing 56 and housing 76*a* and 76*b*. For convenience, degree markings from 0 to 360° are shown.

Each of the ignition striping patterns shown include axially extending stripes. That is, the stripes extend toward the electrodes (not shown), which are connected to the upper and lower edges of housings 36 when in their enclosed cylindrical or other shape. It should be appreciated however as discussed above that the ignition stripes are additionally or alternatively radially disposed or diagonally disposed. Further, it should be appreciated that translational and rotational motion are required regardless to (i) produce a stripe having a width greater than one droplet 100 and (ii) register the housing for the next stripe.

Figure 10:
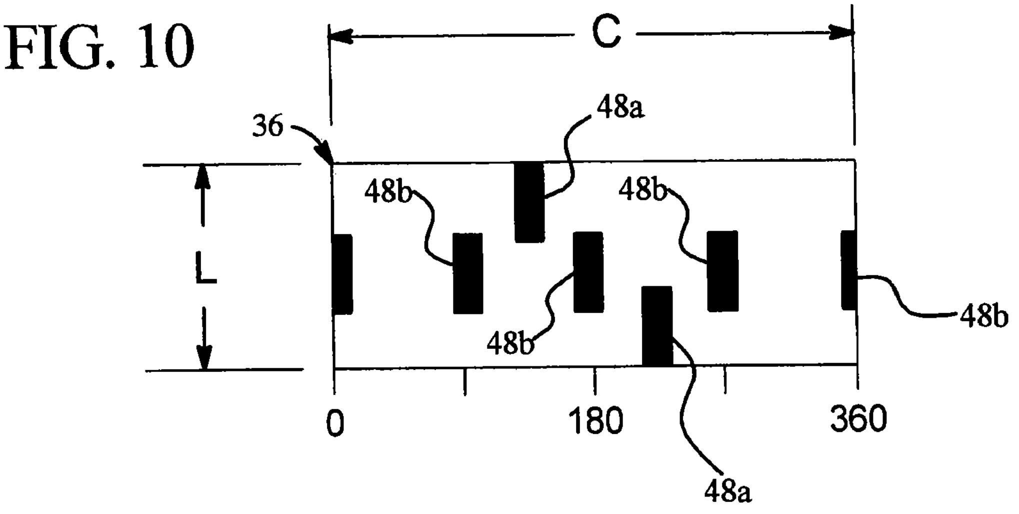
FIGS. 10 to 15 are schematic views of the insides of surge arrester housings having different ignition stripe patterns.

Referring now to FIG. 10, a first example pattern of stripes 48*a* and 48*b* are illustrated. Stripes 48*a* are end stripes that extend to the electrode mating ends of housing 36. Assuming a cylindrical housing 36 to have inside diameter of 3.7 mm (circumference C of about 11.6 mm) and a length L of 5 mm, the following dimensions for stripes 48*a* and 48*b* provide a relative measure of the length and width of stripes 48 (referring collectively to stripes 48*a* and 48*b*) with respect to the dimensions C and L of housing 36. As discussed, such relative comparison is for purposes of example only and is not intended to limit the scope and spirit of the claims.

In the example of FIG. 10, end stripes 48*a* have overall dimensions of 1.5 mm in the L direction and 0.5 mm in the C direction. In one embodiment, stripe 48*a*, which appears to the naked eye as a continuous stripe, is produced by divided the overall dimensions into grids. Here, for example the 1.5 mm length can be divided into 15 segments of 0.1 mm each. The 0.5 mm circumference dimension can be divided into five equal sections of 0.1 mm, producing an overall 15 by 5 grid pattern, wherein each grid location is at least substantially a 0.1 $mm^2$ square. Each square is filled via the one of the systems described above for example filled in by ten droplets 100. Each droplet 100 can for example produce a spot within its associated grid of about 60 μmeters in diameter. Thus each 0.1 $mm^2$ square grid is filled with ten droplet spots of approximately 60 μmeters in diameter. Of course, these numbers are illustrative only and are not intended to limit the scope and spirit of the claims.

Similarly, center stripes 48*b* have an overall dimension of 2 mm by 0.5 mm. This area is divided into a 20 by 5 grid, wherein each grid location is again 0.1 $mm^2$ square. Again, each grid location is filled with ten droplets 100, each creating a spot on inner surface of housing 36 within the associated grid of about 61 μmeters in diameter.

The ignition stripe pattern of FIG. 10 can be tailored for a particular arrester application. That is, the performance characteristics for an arrester having seven end stripes 48*a* versus two end stripes 48*a* and five center stripes 48*b* may be slightly or appreciable different holding all other variables constant.

Figure 11:
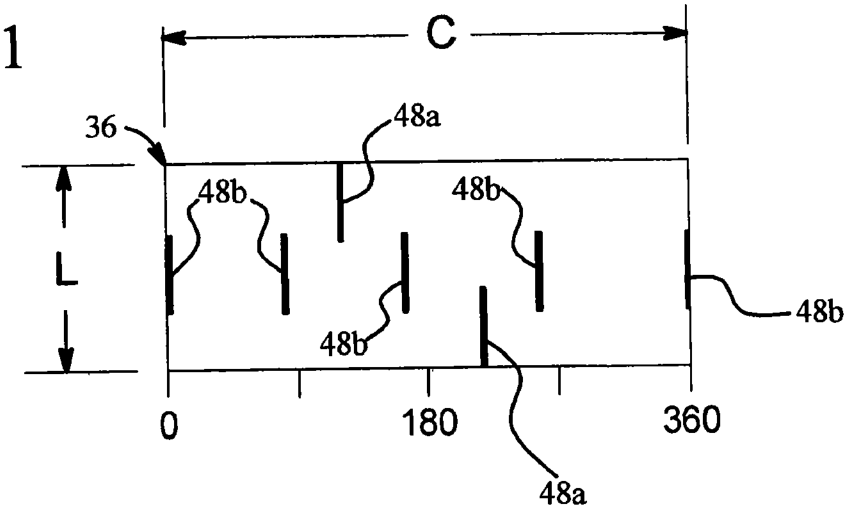

FIG. 11 shows a similar pattern as discussed above in connection with FIG. 10. Here instead, the two end stripes 48*a* are thinner, e.g., provided in an overall dimensioned 1.5 mm by 0.1 mm line. Those overall dimensions are divided for example into a 15 by 1 grid, with each grid location being a 0.1 mm by 0.1 mm square filled with, e.g., ten droplets 100.

Center stripes 48*b* of FIG. 11 have overall dimensions for example of 20 mm by 0.1 mm, which are each divided into a 20 by 1 grid pattern, wherein each grid location is a 0.1 mm by 0.1 mm square filled with, e.g., ten spots per grid location. The performance characteristics for an arrester having two thin end stripes 48*a* and five thin center stripes 48*b* (FIG. 10) may be slightly or appreciable different for an arrester having two wider end stripes 48*a* and five wider center stripes 48*b* (FIG. 11) holding all other variables constant.

Figure 12:
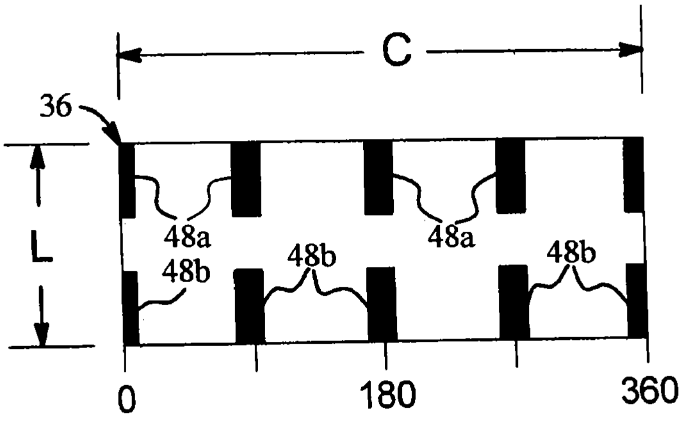

Referring now to FIG. 12, two rows of stripes 48*a* and 48*b*, respectively, each extend from the middle portion of housing 36 to an edge of the housing. These end stripes as well as end stripes 48*a* shown above in connection with FIGS. 10 and 11 can be in electrical communication with the electrodes, e.g., electrodes 44 and 46 shown above in connection with FIG. 4. In such a case, the two rows in FIG. 12 create small gaps between the inner ends of each ignition stripe pair. Each of the ignition stripes 48*a* and 48*b* has overall dimensions for example of a 2 mm by 0.5 mm rectangle, which is divided into twenty-five 0.1 mm by 0.1 mm squares each receiving, e.g., ten droplets 100 of striping material.

Figure 13:
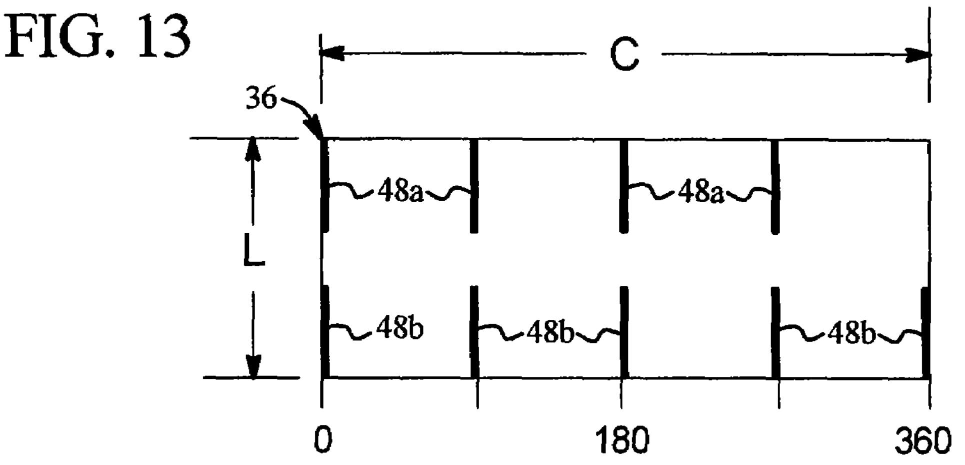

Referring now to FIG. 13, the ignition stripe pattern described above in connection with FIG. 12 is repeated except that each stripe 48*a* and 48*b* is narrowed to a single grid location having 0.1 mm width. Stripes 48*a* and 48*b* at their outer edges can nevertheless be in electrical connection with the electrodes attached to housing 36. In FIGS. 12 and 13 each stripe is located radially approximately 90° from its two adjacent stripes. In FIGS. 10 and 11, the 90° pattern is broken in two places by the end stripes 48*a*. It should be appreciated that radial registration of stripes 48 as well as axial registration, shape and size of the stripes can be controllably varied to provide the desired electrical characteristics.

Figure 14:
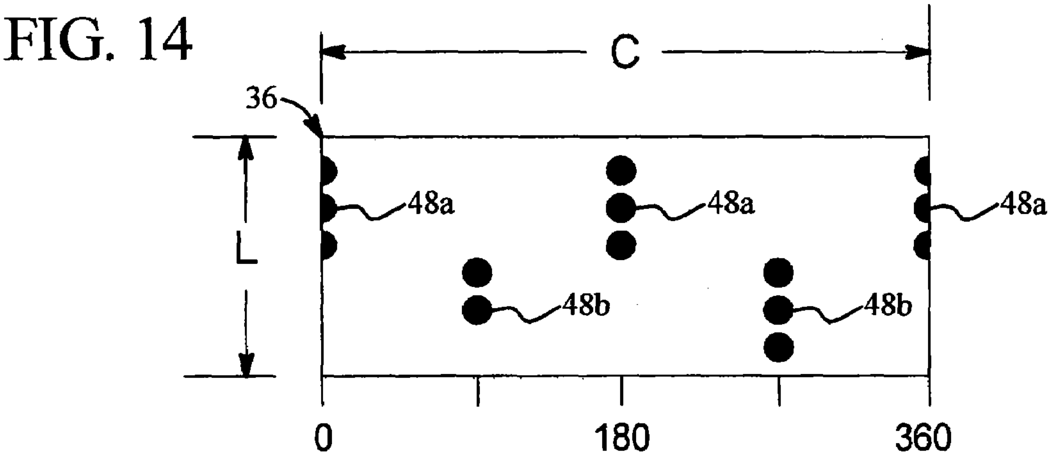
Figure 15:
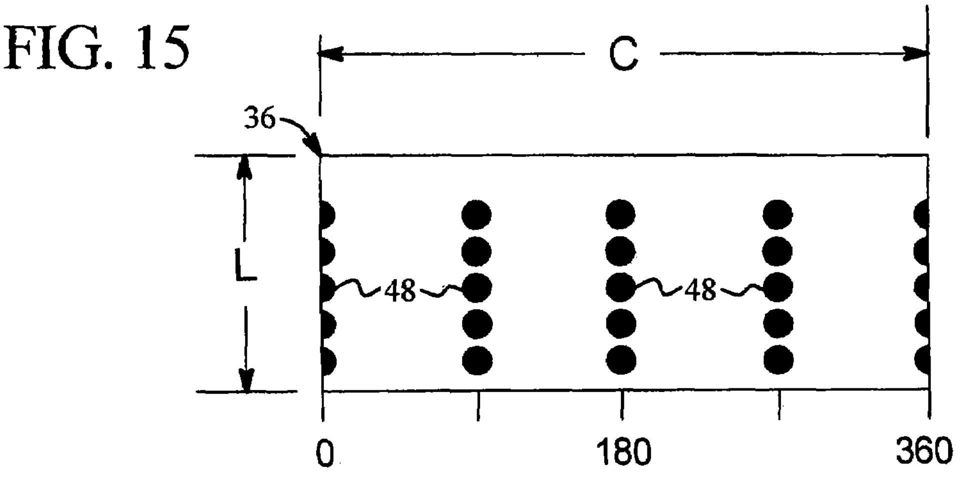

Referring now to FIGS. 14 and 15, a different type of striping pattern is illustrated. FIG. 14 illustrates alternating rows of stripes 48*a* and 48*b*, wherein each stripe is located radially approximately 90° from the next stripe. Each stripe 48*a* and 48*b* is or includes a series of striping spots. Each spot for example can be 0.6 mm in diameter. Each stripe 48*a* and 48*b* includes three spots placed in a 2.5 mm line, where each spot includes five hundred droplets 100. The spots of stripes 48*a* and 48*b* (and the spaces between the spots) in an embodiment are visible to the naked eye.

Referring now to FIG. 15, the spots described above in connection with stripes 48*a* and 48*b* of FIG. 14 are extended across length L of housing 36. Each stripe 48 of FIG. 15 accordingly includes five spots of the dimensions described above.

It should appreciated from the examples in FIGS. 10 to 15 that the apparatus described can create uniquely shaped, sized, oriented and patterned ignition stripes, which heretofore were not available via the traditional pencil striping process. Furthermore, as explained above, these patterns can each be stored in memory and recalled as needed for a particular arrester. Still further, the systems described above can create stripes having a more robust thickness, e.g., via applying multiple droplets to the same portion of the housing.

Figure 16:
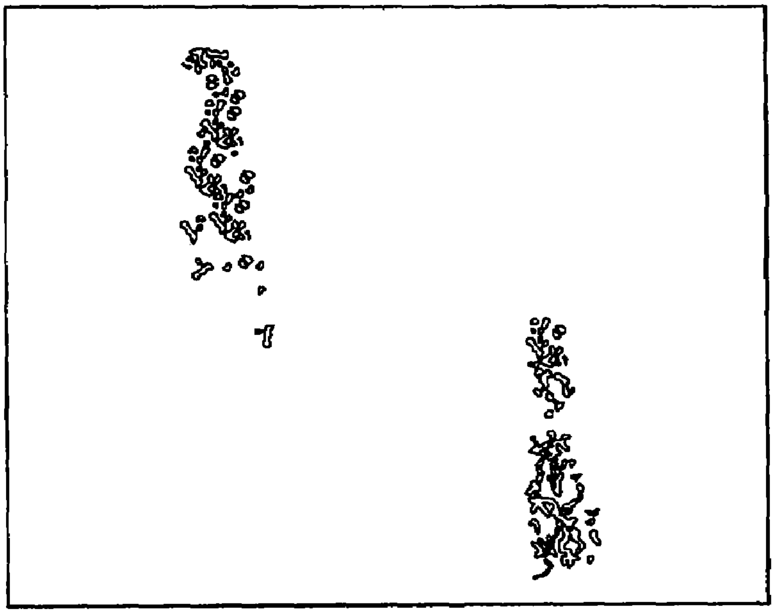
FIGS. 16 and 17 show the resulting difference in ignition stripes between prior art pencil striping and striping via ink-jetting.
Figure 17:
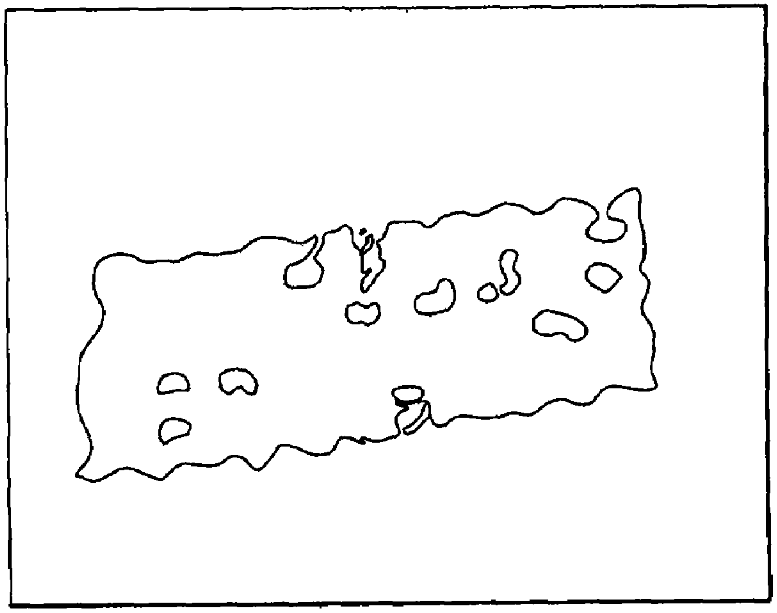

Referring now to FIGS. 16 and 17 ignition stripes produced via pencil striping (FIG. 16) and ink-jetting (FIG. 17) are contrasted. In particular, the ink-jetted stripe produces a shape that is more accurate with respect to the desired shape of the stripe and consequently is more repeatable then the pencil stripes. The ink-jetted stripe is also more continuous and uniform, wherein the pencil stripe is more porous and prone to disruptions along the pencil stripe. It has also been observed that the pencil stripes tend to be flaky and have relatively thinner thicknesses, leading to poor performance. Further, there is a potential that a portion of the flaky ignition stripe can come free from the stripe and contact the admissive material, further hampering performance.

The spacing or registration between pencil stripes is also less controllable and therefore less accurate and repeatable than the spacing achieved by the ink-jetting and motion control apparatus described above. Accordingly, Applicants believe that the ink-jetting method not only has processing advantages, it results in improved ignition stripes 48.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A surge arrester comprising:

at least two electrodes;

an enclosed gas; and an activating compound applied to at least one of said electrodes, the activating compound including nickel powder in an amount of about 10% to about 35% by weight, potassium metasilirate in an amount of about 10% to about 20% by weight, aluminum silicon powder in an amount of about 5% to about 20% by weight, sodium carbonate in an amount of about 5% to about 20% by weight, and cesium chloride in an amount of about 25% to about 45% by weight.

2. The surge arrester of claim 1, wherein the electrodes are attached to at least one insulative housing, the housing having at least one characteristic selected from the group consisting of: (i) housing the enclosed gas; (ii) being made of ceramic, glass or plastic; (iii) supporting at least one ignition stripe; (iv) being at least substantially cylindrical; and (v) being disposed on either side of an inner electrode.

3. The surge arrester of claim 1, wherein the electrode upon which the compound is applied includes at least one characteristic selected from the group consisting of: (i) including depressions into which the compound is applied; (ii) having compound applied to one side of the electrode; (iii) having compound applied to multiple sides of the electrode; (iv) being formed so that a portion of the electrode is spaced closely to another one of the electrodes; and (v) being made of copper, nickel, nickel iron, any combination thereof, any layered combination thereof and any plated combination thereof.

4. The surge arrester of claim 1, wherein the enclosed gas is of at least one type selected from the group consisting of: (i) an inert gas, (ii) a reactive gas, (iii) a pressurized gas, (iv) an evacuated gas, (v) a mixture of gases, (vi) hydrogen, (vii) silane, (viii) nitrogen, (viii) argon, (ix) neon, (x) krypton, (xii) carbon dioxide, and (xiii) helium.

5. The surge arrester of claim 1, which includes multiple ignition stripes ink-jetted onto an inner surface of the housing, said multiple stripes distributed at least one of axially and radially on the inner surface of the housing such that said multiple stripes do not form a conductive path between said electrodes.

6. A surge arrester made via a process comprising the steps of:

providing an insulative housing;

enclosing the housing with at least two electrodes, at least one of the electrodes having an applied activating compound; and ink-jetting multiple ignition depositions disposed onto an interior of the housing, the depositions including at least one non-graphite material, said depositions disposed on the interior of said housing such that said depositions do not form a conductive path between said electrodes.

7. The surge arrestor of claim 6, wherein the insulative housing has at least one characteristic selected from the group consisting of: (i) housing a gas filling; (ii) being made of ceramic, glass or plastic; (iii) being at least substantially cylindrical; and (iv) being disposed about a first of said two electrodes.

8. The surge arrester of claim 6, wherein the electrode upon which the compound is applied includes at least one characteristic selected from the group consisting of: (i) including depressions into which the compound is applied; (ii) having compound applied to one side of the electrode; (iii) having compound applied to multiple sides of the electrode; (iv) being formed so that a portion of the electrode is spaced closely to another one of the electrodes; and (v) being made of copper, nickel, nickel iron, any combination thereof, any layered combination thereof and any plated combination thereof.

9. The surge arrestor of claim 6, which includes at least one additional step selected from the group consisting of: (i) attaching sections of the housing to either side of one of the two electrodes; (ii) pressurizing a gas within the housing; and (iii) evacuating the housing.

10. The surge arrestor of claim 6, wherein the deposition is made of at least one material selected from the group consisting of: (i) graphite; (ii) copper powder dispersed in a liquid vehicle and binding agent; (iii) film resistor element ink; and (iv) conductive film inks diluted to increase resistivity.

11. The surge arrestor of claim 6, wherein ink-jetting the multiple depositions includes at least one of: (i) heating the material; (ii) applying a voltage to the material; (iii) energizing the material; (iv) flowing the material through an opening; (v) deflecting the material; (vi) dispensing droplets of the material to produce a desired pattern of the droplets on the insulative housing; and (vii) catching droplets in a reservoir that are not intended to be part of the deposition.

12. The surge arrestor of claim 6, which includes at least one further step of: (i) rotating the housing and (ii) translating the housing as the deposition is ink-jetted on the housing.

13. The surge arrestor of claim 6, wherein the activating compound includes at least one material selected from the group consisting of: nickel powder, potassium silicate, sodium silicate, titanium powder, sodium carbonate, cesium chloride, sodium bromide, lithium bromide, calcium titanium oxide, potassium metasilirate, aluminum silicon powder, and calcium titanium oxide.

14. A surge arrestor made via a process comprising the steps of:

providing an insulative housing;

enclosing the housing with at least two electrodes, at least one of the electrodes having an applied activating compound; and ink-jetting multiple depositions disposed onto an interior of the housing, the deposition including a pattern of droplets, said depositions disposed on the interior of said housing such that said depositions do not form a conductive path between said electrode.

15. The surge arrestor of claim 14, wherein the insulative housing has at least one characteristic selected from the group consisting of: (i) housing a gas filling; (ii) being made of ceramic, glass or plastic; (iii) being at least substantially cylindrical; and (iv) being disposed about a first of said two electrodes.

16. The surge arrestor of claim 14, wherein the electrode upon which the compound is applied includes at least one characteristic selected from the group consisting of: (i) including depressions into which the compound is applied; (ii) having compound applied to one side of the electrode; (iii) having compound applied to multiple sides of the electrode;

(iv) being formed so that a portion of the electrode is spaced closely to another one of the electrodes; and (v) being made of copper, nickel, nickel iron, any combination thereof, any layered combination thereof and any plated combination thereof.

17. The surge arrestor of claim 14, which includes at least one additional step selected from the group consisting of: (i) attaching sections of the housing to either side of one of the two electrodes; (ii) pressurizing a gas within the housing; and (iii) evacuating the housing.

18. The surge arrestor of claim 14, wherein the deposition is made of at least one material selected from the group consisting of: (i) graphite; (ii) copper powder dispersed in a liquid vehicle and binding agent; (iii) film resistor element ink; and (iv) conductive film inks diluted to increase resistivity.

19. The surge arrestor of claim 14, wherein ink-jetting the multiple depositions includes at least one of: (i) heating the material; (ii) applying a voltage to the material; (iii) energizing the material; (iv) flowing the material through an opening; (v) deflecting the material; (vi) catching droplets in a reservoir that are not intended to be part of the deposition; (vii) using a droplet pattern sequence stored in a computer readable medium to produce the pattern; and (viii) dividing the pattern into grid locations and ink-jetting a number of droplets into each grid location of the pattern.

20. The surge arrestor of claim 14, which includes at least one further step of: (i) rotating the housing and (ii) translating the housing as the deposition is ink-jetted on the housing.

21. The surge arrestor of claim 20, the housing being at least substantially cylindrical, wherein the desired pattern of depositions includes at least one of: (i) a desired axial spacing and (ii) a desired radial spacing.

22. The surge arrestor of claim 14, wherein the depositions are at least one of: (i) at least generally continuous due to a close spacing of the droplets; (ii) at least generally rectangular; (iii) formed as a line; (iv) axially extending along the housing, which is at least substantially cylindrical; and (v) formed from a plurality of discernable and separated shapes.

23. A system for depositing a plurality of stripes within a surge arrester comprising:

a holder configured to secure a housing, said housing having a substantially circular cross section and a first longitudinal length, said housing extending within said holder at least a portion of said first longitudinal length;

a reservoir configured to contain striping material;

a nozzle including a relatively thin tube having a second longitudinal length corresponding to the first longitudinal length, said tube having a cross section configured to fit within said housing, said tube including at least one orifice disposed along said second longitudinal length;

a supply line connected between said reservoir and said nozzle, said supply line configured to supply said striping material to said nozzle wherein said striping material is disposed on a surface of said housing in droplets projected from said orifice to form each of said plurality of stripes.

24. The system of claim 23 further comprising an energy source disposed between said reservoir and said nozzle, said energy source configured to transfer energy to said striping material such a size of each of said droplets is determined by the amount of energy transferred to said striping material over a given time period.

25. The system of claim 24 further comprising a pair of electrodes configured to generate an electrostatic field positioned proximate said orifice, said electrostatic field configured to separate and charge each of said droplets.

26. The system of claim 25 wherein said pair of electrodes is a first pair of electrodes, said system further comprising a second pair of electrodes configured to generate a deflection field disposed between said electrostatic field and said surface of said housing, said second pair of electrodes configured to impart a voltage to each of said droplets such that each of said droplets is directed to a desired position on said surface of said housing.

27. The system of claim 26 further comprising:

a driver;

a microprocessor communicating with said driver; and a memory communicating with said microprocessor, said memory configured to store at least one pattern associated with said plurality of stripes on said surface of said housing, said microprocessor configured to recall said pattern from said memory and sending a control signal to said driver, said driver configured to convert said control signal into a charge pattern to be applied to each of said droplets by said electrostatic field.

* * * * *

UNITED STATES PATENT AND TRADEMARK OFFICE

CERTIFICATE OF CORRECTION

PATENT NO. : 7,643,265 B2
APPLICATION NO. : 11/531903
DATED : January 5, 2010
INVENTOR(S) : Loader et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 611 days.

Signed and Sealed this

Sixteenth Day of November, 2010

David J. Kappos

*Director of the United States Patent and Trademark Office*